United States Patent
Stein

(10) Patent No.: US 9,459,515 B2
(45) Date of Patent: Oct. 4, 2016

(54) ADJUSTABLE CAMERA MOUNT FOR A VEHICLE WINDSHIELD

(75) Inventor: Gideon Stein, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

(21) Appl. No.: 13/484,684

(22) Filed: May 31, 2012

(65) Prior Publication Data

US 2012/0233841 A1 Sep. 20, 2012

Related U.S. Application Data

(63) Continuation of application No. 12/573,836, filed on Oct. 5, 2009, now Pat. No. 8,254,635.

(60) Provisional application No. 61/193,528, filed on Dec. 5, 2008.

(51) Int. Cl.
| | |
|---|---|
| *G06K 9/00* | (2006.01) |
| *G03B 17/02* | (2006.01) |
| *G03B 17/56* | (2006.01) |

(52) U.S. Cl.
CPC ............ *G03B 17/02* (2013.01); *G03B 17/561* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 5,111,289 A * | 5/1992 | Lucas et al. .................. 348/148 |
| 5,729,016 A * | 3/1998 | Klapper et al. .............. 250/334 |
| 5,850,254 A | 12/1998 | Takano et al. |
| 6,246,961 B1 | 6/2001 | Sasaki et al. |
| 6,593,698 B2 | 7/2003 | Stam et al. |
| 6,679,467 B1 * | 1/2004 | Softness .................. 248/278.1 |
| 6,795,111 B1 * | 9/2004 | Mazzilli ...................... 348/148 |
| 6,813,371 B2 * | 11/2004 | Kakinami ............... G01S 11/12 340/333 |
| 6,813,545 B2 | 11/2004 | Stromme |
| 6,874,220 B1 * | 4/2005 | Jones ............................ 29/594 |
| 7,058,206 B1 | 6/2006 | Janssen et al. |
| 7,113,867 B1 | 9/2006 | Stein |
| 7,327,855 B1 | 2/2008 | Chen |
| 7,446,650 B2 * | 11/2008 | Scholfield et al. ........... 340/438 |
| 7,566,851 B2 | 7/2009 | Stein et al. |
| 7,764,808 B2 | 7/2010 | Zhu et al. |
| 7,800,645 B2 * | 9/2010 | Nonoyama et al. ......... 348/144 |
| 8,017,898 B2 * | 9/2011 | Lu et al. ..................... 250/208.1 |
| 8,254,635 B2 * | 8/2012 | Stein .................. G06K 9/00798 382/103 |
| 8,520,070 B1 * | 8/2013 | Englander et al. .......... 348/148 |

(Continued)

FOREIGN PATENT DOCUMENTS

WO 2008134715 A1 11/2008

OTHER PUBLICATIONS

"Preceding Vehicle and Road Lanes Recognition Methodsfor RCAS Using Vision System", Toshio Ito et al, pp. 85-90, Proc. Int. Symp. on intelligent vehicles, Paris 1994.

(Continued)

*Primary Examiner* — Nancy Bitar
(74) *Attorney, Agent, or Firm* — Finnegan, Henderson, Farabow, Garrett & Dunner, LLP

(57) ABSTRACT

A camera mount for mounting a camera inside a windshield of a vehicle. The camera includes a lens mount and a camera housing. The front tip of the lens mount is constrained to be in close proximity to or constrained to contact the inside of the windshield for different rake angles of the windshield.

12 Claims, 16 Drawing Sheets

(56) References Cited

U.S. PATENT DOCUMENTS

| | | | |
|---|---|---|---|
| 2001/0006554 A1* | 7/2001 | Kakinami | 382/104 |
| 2004/0145457 A1* | 7/2004 | Schofield et al. | 340/425.5 |
| 2006/0034484 A1 | 2/2006 | Bahlmann et al. | |
| 2006/0125919 A1* | 6/2006 | Camilleri | B60R 1/00 348/148 |
| 2008/0130149 A1* | 6/2008 | Blank et al. | 359/838 |
| 2008/0137908 A1 | 6/2008 | Stein et al. | |
| 2008/0212215 A1* | 9/2008 | Schofield et al. | 359/844 |
| 2008/0266396 A1* | 10/2008 | Stein | G06K 9/00805 348/148 |
| 2009/0046894 A1 | 2/2009 | Robert et al. | |
| 2010/0172542 A1* | 7/2010 | Stein et al. | 382/103 |
| 2010/0328644 A1* | 12/2010 | Lu et al. | 356/5.01 |
| 2011/0026152 A1* | 2/2011 | Blank | B60R 1/12 359/872 |
| 2011/0163904 A1* | 7/2011 | Alland et al. | 342/1 |

OTHER PUBLICATIONS

"A theory of visual control of braking based on information about time-to-collision", David N Lee, Perception, 1976, vol. 5, pp. 437-459.

"Vision-Based Car-Following: Detection, Tracking, and Identification" Michael Schwarzinger et al, pp. 24-29, Proc. of the Intelligent Vehicles '92 Symposium.

* cited by examiner

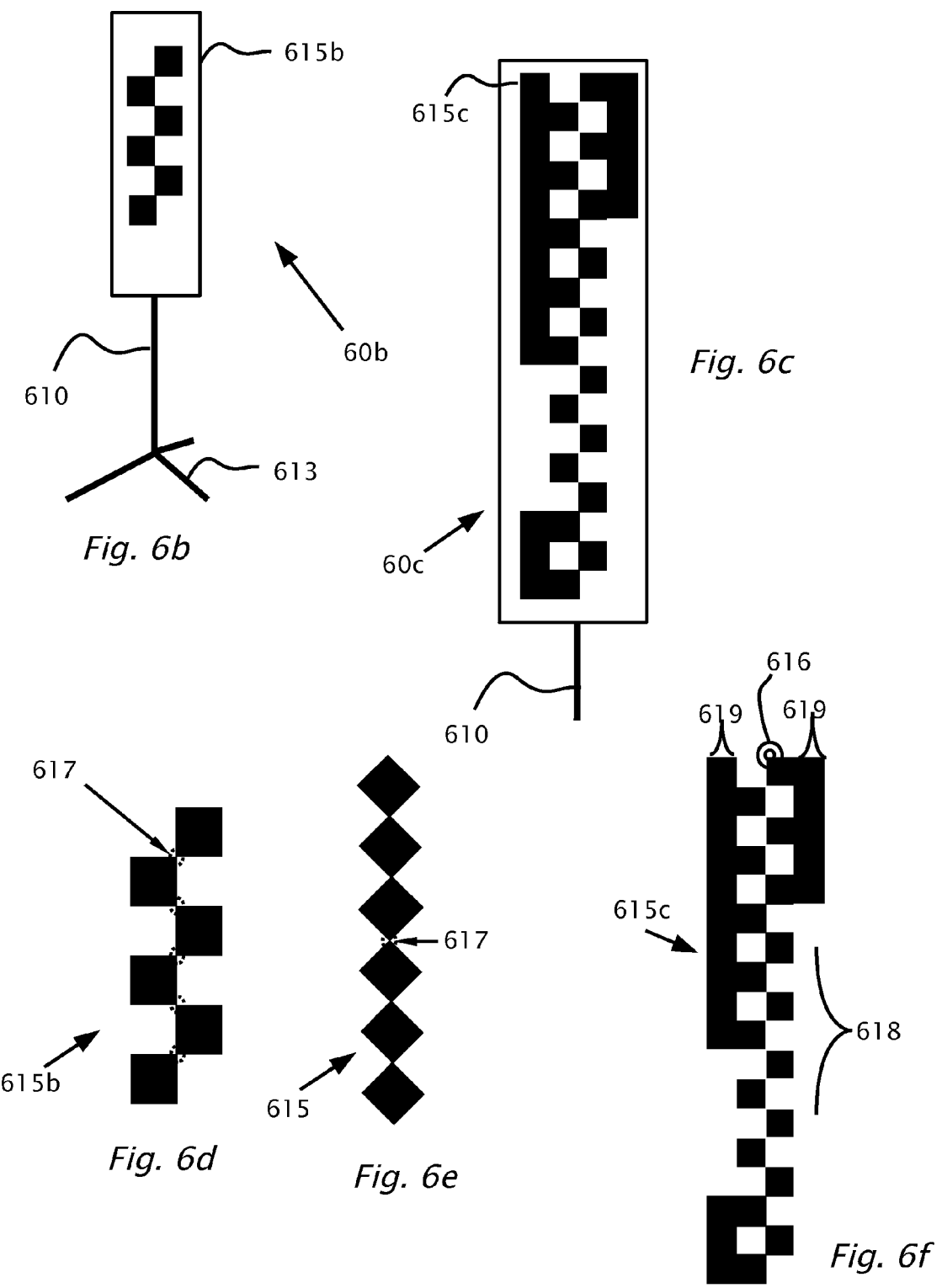

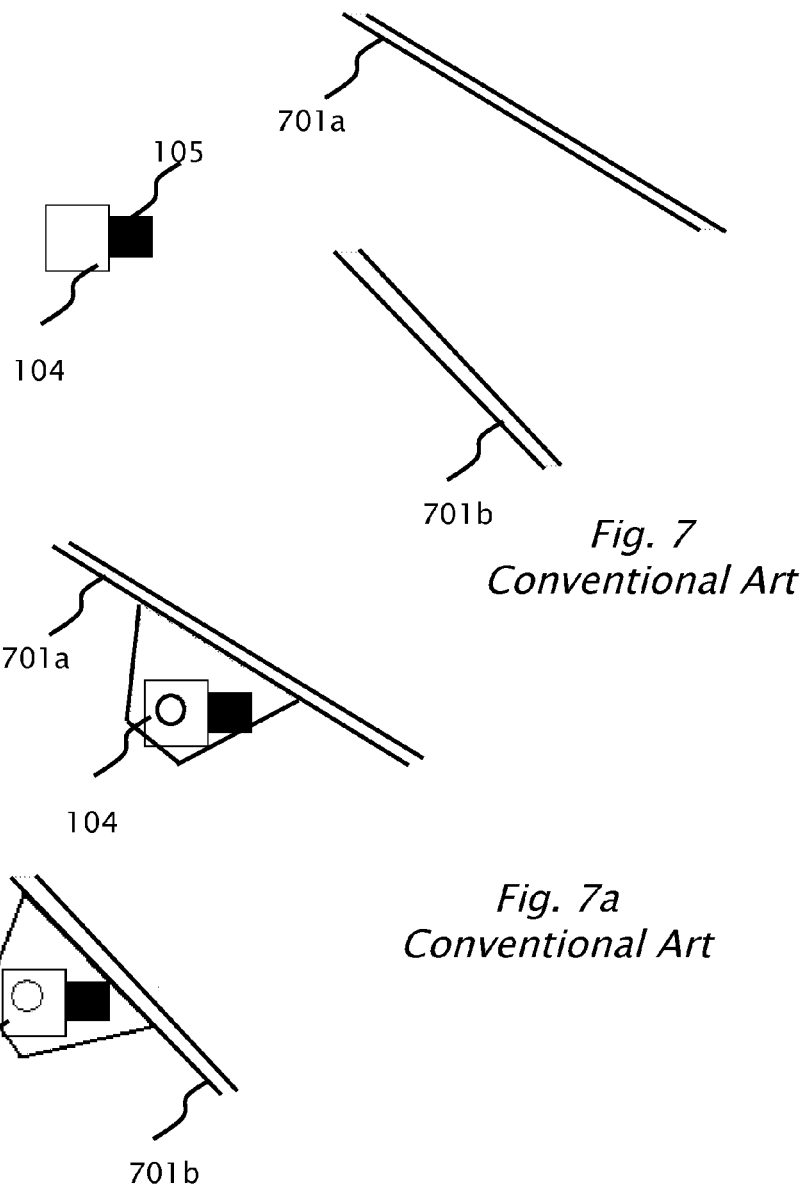

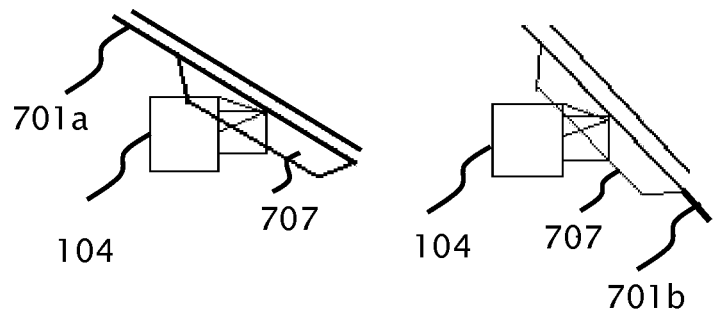
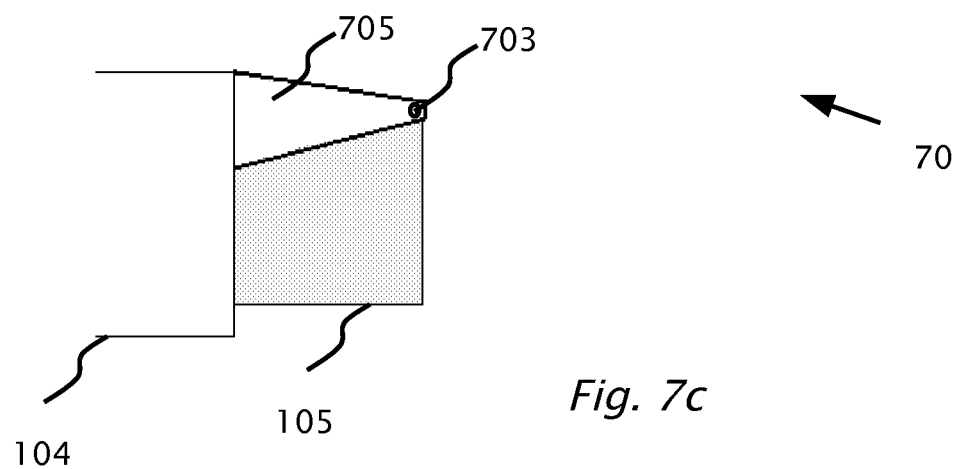
*Fig. 7b*
*Fig. 7c*
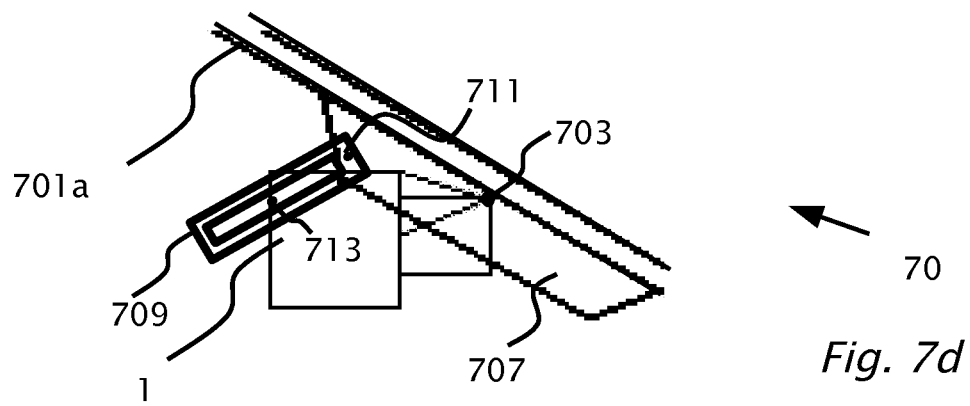
*Fig. 7d*

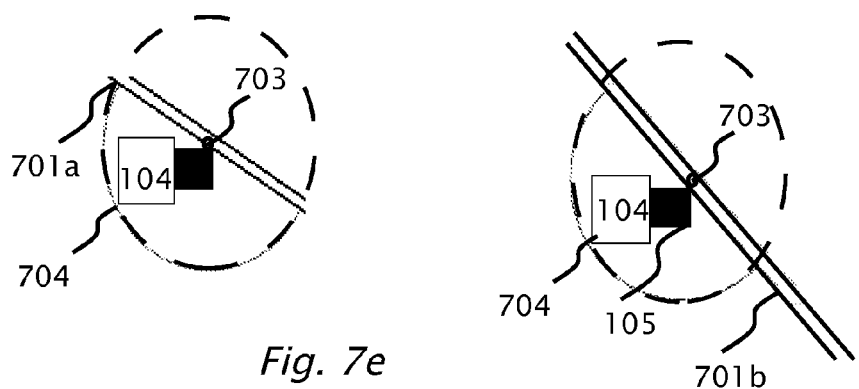
*Fig. 7e*
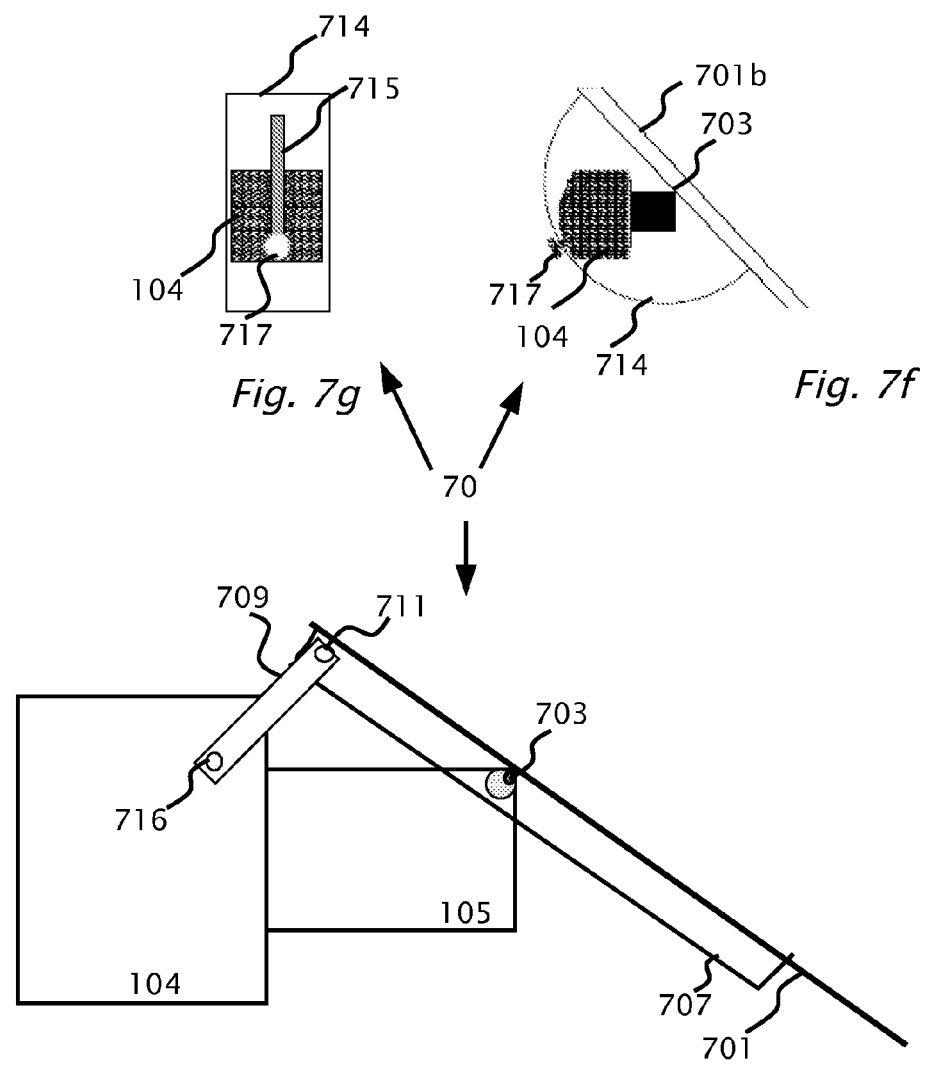
*Fig. 7g*
*Fig. 7f*
*Fig. 7i*

ADJUSTABLE CAMERA MOUNT FOR A VEHICLE WINDSHIELD

CROSS REFERENCE TO RELATED APPLICATIONS

The present application claims priority from U.S. patent application, 61/193,528 filed by the present inventor on 5 Dec. 2008, and from U.S. patent application Ser. No. 12/573,836 filed by the present inventor on 5 Oct. 2009, the disclosures of which are incorporated herein by reference.

BACKGROUND

1. Technical Field

The present invention relates to multiple driver assistance systems and more specifically to the integration of the driver assistance systems onto a single hardware platform.

2. Description of Related Art

During the last few years camera based driver assistance systems (DAS) have been entering the market; including lane departure warning (LDW), Automatic High-beam Control (AHC), traffic sign recognition (TSR) and forward collision warning (FCW).

Lane departure warning (LDW) systems are designed to give a warning in the case of unintentional lane departure. The warning is given when the vehicle crosses or is about to cross the lane marker. Driver intention is determined based on use of turn signals, change in steering wheel angle, vehicle speed and brake activation. There are various LDW systems available. One algorithm for lane departure warning (LDW) used by the assignee (Mobileye Technologies Ltd., Nicosia, Cyprus, hereinafter "Mobileye") of the present application is predictive in that it computes time to lane crossing (TLC) based on change in wheel-to-lane distance and warns when the time-to-lane crossing (TLC) is below a certain threshold. Other algorithms give a warning if the wheel is inside a certain zone around the lane marker. In either case, essential to the lane departure warning system is the lane marker detection algorithm. Typically, the lane markers are detected in the camera image and then, given the known camera geometry and camera location relative to the vehicle, the position of the vehicle relative to the lane is computed. The lane markers detected in the camera image are then collected over time, for instance using a Kalman filter. Wheel-to-lane marker distance may be given with an accuracy of better than 5 centimeters. With a forward looking camera, wheel-to-lane marker distance is not observed directly but is extrapolated from the forward view of the camera. The closer road markings are observed, less extrapolation is required for determining wheel-to-lane marker distance and more accurate estimates of wheel-to-lane marker distance are achieved especially on curves of the road. Due to the car hood and the location of the camera, the road is seldom visible closer than six meters in front of the wheels of the car. In some cars with longer hoods, minimal distance to visible road in front of the car is even greater. Typically the lane departure warning system of Mobileye works on sharp curves (with radius down to 125 m). With a horizontal field of view (FOV) of 39 degrees of the camera, the inner lane markers are still visible on curves with a radius down to 125 meters. In order to correctly perform lane assignment on curves, lane markings are detected at 50 meters and beyond. With a horizontal field of view (FOV) of 39 degrees for the camera, a lane mark of width 0.1 meters at 50 m distance corresponds in the image plane to just under two pixels wide and can be detected accurately. The expectation from the lane departure warning systems is greater than 99% availability when lane markings are visible. Expectation with 99% availability is particularly challenging to achieve in low light conditions when the lane markings are not freshly painted (have low contrast with the road) and the only light source is the car halogen headlights. In low light conditions, the lane markings are only visible using the higher sensitivity of the clear pixels (i.e. using a monochrome sensor or a red/clear sensor). With the more powerful xenon high intensity discharge (HID) headlights it is possible to use a standard red green blue (RGB) sensor in most low light conditions.

The core technology behind forward collision warning (FCW) systems and headway distance monitoring is vehicle detection. Assume that reliable detection of vehicles in a single image a typical forward collision warning (FCW) system requires that a vehicle image be 13 pixels wide, then for a car of width 1.6 m, a typical camera (640×480 resolution and 40 deg FOV) gives initial detection at 115 m and multi-frame approval at 100 m. A narrower horizontal field of view (FOV) for the camera gives a greater detection range however; the narrower horizontal field of view (FOV) will reduce the ability to detect passing and cutting-in vehicles. A horizontal field of view (FOV) of around 40 degrees was found by Mobileye to be almost optimal (in road tests conducted with a camera) given the image sensor resolution and dimensions. A key component of a typical forward collision warning (FCW) algorithm is the estimation of distance from a single camera and the estimation of scale change from the time-to-contact/collision (TTC) as disclosed for example in U.S. Pat. No. 7,113,867.

Traffic sign recognition (TSR) modules are designed typically to detect speed limit signs and end-of-speed limit signs on highways, country roads and urban settings. Partially occluded, slightly twisted and rotated traffic signs are preferably detected. Systems implementing traffic sign recognition (TSR) may or should ignore the following signs: signs on truck/buses, exit road numbers, minimum speed signs, and embedded signs. A traffic sign recognition (TSR) module which focuses on speed limit signs does not have a specific detection range requirement because speed limit signs only need to be detected before they leave the image. An example of a difficult traffic sign to detect is a 0.8 meter diameter traffic sign on the side of the road when the vehicle is driving in the center lane of a three lane highway. Further details of a TSR system is disclosed by the present assignee in patent application publication US20080137908.

A typical automatic headlight or high/low beam control (AHC) system detects the following conditions and switches from high beams to low beams: headlights of oncoming vehicles, taillights of preceding vehicles, street lights or ambient light indicating that high beams are not required and a low vehicle speed. The host vehicle lights are switched back to high beams when none of these conditions exist (often after a specified grace period). One approach for detecting taillights is to compare images from two sensors: one with a red filter and the second with a cyan filter. The cyan filter responds to non-red light sources and will give zero response to red light. By comparing corresponding pixels from two imaging sensors one can detect the color of the light source. The number of pixels of each color above a certain intensity is counted and if the count is above a threshold the systems switches to low beams. The use of color filters with imaging sensors may preclude the simultaneous use of the same image frames for other driver assistance applications.

A second approach for automatic high-beam control (AHC) uses an RGB sensor to give better color differentiation. Typical light sources can be located in the full CIE color space as defined by the International Commission on Illumination. This approach distinguishes between green, yellow and red lights. A powerful green traffic light is not confused with an oncoming vehicle. Since a single sensor with a color mosaic filter i.e. Bayer pattern mosaic is used, the lens is defocused so as to spread a light source over multiple pixels. The use of the color mosaic filter reduces both the effective image sensor resolution (by 50%) and the intensity response (to less than one third). The color mosaic filter may preclude the use of the same sensor for traffic sign recognition (TSR) or lane departure warning (LDW) because of the intensity response penalty.

Given that forward collision warning (FCW), traffic sign recognition (TSR) and lane departure warning (LDW) already require a high resolution monochrome sensor, a new automatic high-beam control (AHC) algorithm was developed for use with high resolution monochrome sensors as disclosed in U.S. Pat. No. 7,566,851. A number of different pattern recognition techniques are used with higher resolution monochrome imaging sensors to identify light sources instead of relying on color information. The automatic high-beam control (AHC) algorithm includes the following features: Detect bright spots in the sub-sampled long exposure image and then perform clustering and classification in the full resolution image, classify spots based on brightness, edge shape, internal texture, get further brightness information from the short exposure frames and classify obvious oncoming headlights based on size and brightness, track spots over time and compute change in size and brightness, pair up matching spots based on similarity of shape, brightness and motion, classify pairs as oncoming or taillights based on distance, brightness and color, and estimate distance and where unmatched spots might be motorcycles taillights.

The term "electronic traffic sign" as used herein refers to variable message signs, pulsed electronic traffic signs and/or back-lit traffic signs. A variable message sign (VMS) and in the UK known as a matrix sign is an electronic traffic sign often used on roadways to give travelers information about special events. Such signs warn of traffic congestion, accidents, incidents, roadwork zones, or speed limits on a specific highway segment. In urban areas, VMS are used within parking guidance and information systems to guide drivers to available car parking spaces. They may also ask vehicles to take alternative routes, limit travel speed, warn of duration and location of the incidents or just inform of the traffic conditions Pulsed electronic traffic signs include an array on light emitting diodes (LEDs) Typically the light emitting diodes (LEDs) in electronic signs are not on all the time but are pulsed at a high frequency (typically 80 Hz to 160 Hz) giving varying cycle times for the light emitting diodes (LEDs) in electronic signs (typically between 12.5 mS to 5.25 mS). The LED frequency, LED duty cycle and LED light intensity vary from electronic sign to electronic sign. Moreover, electronic signs are not uniform across all countries and even vary according to the time of day and ambient light levels. However, the typical cycle time of all LED electronic signs is smaller than 11.4 milliseconds and longer than 6 milliseconds.

Support vector machines (SVMs) are a set of related supervised learning methods used for classification and regression. Support vector machines (SVMs) belong to a family of generalized linear classifiers Support vector machines (SVMs) can also be considered a special case of Tikhonov regularization. A special property of SVMs is that they simultaneously minimize the empirical classification error and maximize the geometric margin; hence they are also known as maximum margin classifiers.

Viewing the input data as two sets of vectors in an n-dimensional space, an SVM will construct a separating hyper-plane in that space, one which maximizes the "margin" between the two data sets. To calculate the margin, two parallel hyper-planes are constructed, one on each side of the separating one, which are "pushed up against" the two data sets. Intuitively, a good separation is achieved by the hyper-plane that has the largest distance to the neighboring data points of both classes. The hope is that, the larger the margin or distance between these parallel hyper-planes, the better the generalization error of the classifier will be.

In geometry, a two-dimensional Bravais lattice, studied by Auguste Bravais (1850), is a set of points generated by a set of discrete translation operations described by:

$$R = n_1 \bar{a}_1 + n_2 \bar{a}_2$$

where $n_i$ are any integers and $\bar{a}_i$ are known as the primitive vectors which lie in a plane and span the lattice. For any choice of position vector, the lattice looks the same.

The term "exposure" and "exposure time" are used herein interchangeably and refers to the time duration of image integration in an image sensor.

The term "detection" in the context of traffic sign detection as used hereinafter refers to detecting that there is a putative traffic sign in the environment of the vehicle such as by detecting the outline of a traffic sign. The term "recognition" in the context of traffic sign recognition refers to reading and/or interpreting the content or meaning of the traffic sign.

The terms "maximal" and "minimal" in the context of transmittance of optical filters are relative terms, for instance a range of wavelengths in which there is "maximal transmittance means that there is a relative maximum on the average in that wavelength range compared with the adjacent ranges of wavelengths.

The term "substantial" transmittance refers to transmittance greater than eighty percent on the average in the wavelength range. The term "insubstantial" transmittance means less than twenty percent transmittance on the average in the wavelength range.

A camera has six degrees of freedom, three of which involve rotations: pan, tilt and roll. A "pan" is a rotary pivoting movement of the camera from left to right or vice versa. In a three dimensional coordinate system where y is the vertical axis, a "pan" is a rotation of the camera around the vertical or y axis. A "tilt" is an up and/or down movement of the camera, or a rotation around the horizontal or x axis. A "roll" is a rotation of the camera about the z axis that is the optical axis of the camera. These terms are analogous to the aeronautical terms yaw, pitch and roll. Yaw is synonymous with pan. Pitch is synonymous with tilt, and roll has the same meaning in both nomenclatures.

The term "camera parameter" as used herein in the context of calibration of a camera refers to one or more of the six degrees of freedom, for instance camera height from the ground and/or camera orientation parameters, e.g. "pitch", "roll" and "yaw".

The term "rake angle" of a windshield of a vehicle is the angle between the vertical and the surface of the windshield in the middle of the windshield where the windshield approximates a plane surface.

The term "partitioning" or "to partition" as used herein refers to assigning different attributes to different image frames, for example by capturing different partitions with different camera parameters, e.g. gain, exposure time. The term "partitioning" as used herein does not refer to dividing an image frame into parts, e.g. two halves of of an image frame. In the context of "image frames", the terms "portion" and "partition" are used herein interchangeably.

BRIEF SUMMARY

According to an embodiment of the present invention there is provided a method for performing a driver assistance function using a computerized system mounted on a moving vehicle. The computerized system includes a camera and an image processor. Under control of the image processor the camera is adapted for capturing in real time image frames of the environment in the field of view of the camera. A first portion and a second portion of the image frames are partitioned. For the first portion, a camera parameter is controlled based on ambient lighting conditions in the environment in the field of view of the camera. Based on the camera parameter of the first portion, a camera parameter of the second portion is set. The image frames are captured and transferred to the image processor for processing of the driver assistance function. The camera parameters of the first and second portions are gain and/or exposure time. When the driver assistance function includes detection and recognition of traffic signs, the detection of the traffic signs uses the first portion of the image frames and the recognition of the traffic sign uses the second portion of the image frames. When the traffic sign is an electronic traffic sign, both the first portion of the image frames and the second portion of the image frames may be used for recognition of the traffic sign. The electronic traffic sign may be a pulsed electronic traffic sign, a variable message traffic sign and/or a back-lit traffic sign. For the second portion of the image frames, a short exposure time is set which is substantially shorter than the exposure time of the first portion. The camera parameter of the second portion of the image frames is set substantially differently between day-mode operation during the day and night-mode operation during the night. Optionally the camera parameter of the second portion is set substantially differently during dusk for dusk-mode operation than during the day-mode operation and/or the camera parameter of the second portion is set substantially differently during dusk for dusk-mode operation than during the night-mode operation.

A third portion of the image frames is optionally partitioned and for the third portion a yet shorter exposure time is set substantially shorter than the short exposure time of the second portion. When the traffic sign is an electronic traffic sign, during the day the recognition of the electronic traffic sign may be performed using all three portions of the image frames each with the substantially different exposure times and at night, the third portion is typically used for automatic headlight control. At night, exposure of the second portion of the image frames is optionally toggled between values selected to be complementary to the camera parameters of image frames of the third portion. When the driver assistance function includes detection of traffic signs, a gain is controlled based on a portion of the image frames including an image of the road and not on an a portion of the image frames image where traffic signs are likely to be imaged.

According to an embodiment of the present invention there is provided a traffic sign recognition system including a detection mechanism adapted for detecting a candidate traffic sign and a recognition mechanism adapted for recognizing the candidate traffic sign as being an electronic traffic sign. A partitioning mechanism may be adapted for partitioning the image frames into a first partition and a second partition. The detection mechanism may use the first portion of the image frames and the recognition mechanism may use the second portion of the image frames. When the candidate traffic sign is detected as an electronic traffic sign, the recognition mechanism may use both the first partition of the image frames and the second portion of the image frames.

According to an embodiment of the present invention there is provided a patterned color filter including: a yellow (Y) portion adapted for maximal transmittance of light of wavelength between 550 nanometers and 800 nanometers and modified cyan (C) portion adapted for maximal transmittance of light of wavelength between 400 and 550 nanometers and adapted for minimal transmittance for light of wavelengths between 600 and 800 nanometers. A magenta (M) portion is optionally adapted for minimal transmittance of visible light of wavelengths between 500 and 600 nanometers and maximal transmittance between 400 and 500 nanometers and above 600 nanometers. The yellow portion is substantially equal in area to the modified cyan portion and the magenta portion combined. The magenta portion usually includes one quarter of the area of the patterned filter and the modified cyan portion usually includes one quarter of the area of the patterned filter. The yellow portion, the modified cyan portion and the magenta portion are usually symmetrically disposed on the patterned color filter as a two-dimensional Bravais lattice including multiple cells. Each of the cells are included in only one of the colored portions of the yellow portion, the modified cyan portion and the magenta portion. The nearest neighboring cells of the Bravais lattice are included in different colored portions of the yellow portion, the modified cyan portion and the magenta portion. The two-dimensional Bravais lattice may be defined by two primitive vectors. In the direction of one or both of the primitive vectors the colored portions may be ordered alternately according to YCYCYC . . . and MYMYMY . . . . In the direction of one of the primitive vectors the colored portions may be ordered according to: YCYMYCYMYCYM . . . . The cells are of dimension corresponding to picture elements of an image sensor.

According to an embodiment of the present invention there is provided a driver assistance system including an image sensor including multiple picture elements (pixels). An image processor connects to the image sensor. The image processor is adapted for receiving image frames from the image sensor. The image sensor and the image processor are adapted for mounting on a vehicle. A patterned color filter filters light prior to sensing by the image sensor. The patterned color filter includes a yellow (Y) portion adapted for maximal transmittance of light of wavelength between 550 nanometers and 800 nanometers and modified cyan (C) portion adapted for maximal transmittance of light of wavelength between 400 and 550 nanometers and adapted for minimal transmittance for light of wavelengths above 600 to at least 800 nanometers. A magenta (M) portion is optionally adapted for minimal transmittance of visible light of wavelengths between 500 and 600 nanometers and maximal transmittance between 400 and 500 nanometers and above 600 nanometers. The yellow portion is substantially equal in area to the modified cyan portion and the magenta portion combined. The magenta portion usually includes one quarter of the area of the patterned filter and the modified cyan portion usually includes one quarter of the area of the patterned filter. The yellow portion, the modified cyan portion and the magenta portion are usually symmetrically disposed on the patterned color filter as a two-dimensional Bravais lattice including multiple cells. Each of the cells are included in only one of the colored portions of the yellow portion, the modified cyan portion and the magenta portion. The nearest neighboring cells of the Bravais lattice are included in different colored portions of the yellow portion, the modified cyan portion and the magenta portion. The two-dimensional Bravais lattice may be defined by two primitive vectors. In the direction of one or both of the primitive vectors the colored portions may be ordered alternately according to YCYCYC . . . and MYMYMY . . . . In the direction of one of the primitive vectors the colored portions may be ordered according to: YCYMYCYMY-CYM . . . wherein in the direction of the second primitive vector the colored portions are ordered alternatively YCY-CYC . . . and YMYMYM . . . . Each of the cells are of dimension corresponding to multiple picture elements (pixels) of the image sensor. The captured image frames include three separable images corresponding to the colored portions. The image processor uses the image from the yellow portion for both lane departure warning and traffic sign recognition. The image processor optionally uses the image from the yellow portion and other color information from one of the images from the cyan and the magenta portions for lane departure warning. The image processor may be configured to use at least two of the three separable images to detect traffic signs. The image processor is configured to use the image of the modified cyan portion to distinguish between headlights and taillights.

According to an embodiment of the present invention there is provided a method using a computerized system including a camera mounted on a host vehicle. Under control of an image processor, the camera is adapted for capturing in real time image frames of the environment in the field of view of the camera. An image feature is located in a first image frame. The image feature includes an image of a point of the road surface beneath the preceding vehicle. The image feature is tracked to a second image frame. The time stamp of the second image frame is subtracted from the time stamp of the first image frame to produce a time difference. The distance to the preceding vehicle may be computed based on the time difference and/or a headway warning may be provided based on the time difference. The headway may be estimated using the time difference. The headway is the time required for the host vehicle to reach the current position of the preceding vehicle. The image feature may include a pair of image points separated by a distance in image space of the road surface. The time-to-contact may be computed based on a difference of a distance in image space between the first image frame and the second image frame. Time-to-contact may be computed as the time difference divided by the relative change of the distance.

According to an embodiment of the present invention there is provided a method for estimating headway between a host vehicle and a preceding vehicle. The headway is the time required for the host vehicle to reach the current position of the preceding vehicle. A computerized system including a camera and an image processor is mounted on the host vehicle. Under control of the processor the camera is adapted for capturing in real time multiple image frames i of the environment in the field of view of the camera. An image feature is located in the image frames. The image feature includes a distance $d_i$ in image space imaged from a portion of the road surface beneath the preceding vehicle. The image feature is subsequently tracked over the image frames i usually until the image feature reaches the bottom of one of image frames i. The distance $d_i$ in image space is measured for the image frames i. Time $t_i$ is measured based on respective time stamps of the image frames i. The reciprocal $1/d_i$ of the distance $d_i$ is computed as a function of time. The function is fit to a curve on a time axis and the curve is extrapolated toward zero. The intercept of the function $1/d_i$ with the time axis gives an estimate of the headway. When the host vehicle acceleration is negligible, the curve substantially fits a line. When host vehicle acceleration is substantial the curve substantially fits a parabola.

According to an embodiment of the present invention, there is provided a method for detecting fog in the environment of a moving vehicle. A computerized system is mounted on the moving vehicle. The system includes a camera and an image processor. Under control of the processor the camera is adapted for capturing in real time multiple image frames of the environment in the field of view of the camera. A halo is detected in the image frames and the halo is classified as being caused by light scattered from the fog.

Optionally, a light source is synchronized with the capture of the image frames so that, a first image frame is captured when the light source is switched on a second image frame is captured when the light source is switched off. The second image frame may be subtracted from the first image frame or otherwise compared or correlated. The halo is caused by the light originating from the light source. The light source may be a tail light of the vehicle. When the light originates from two taillights of the vehicle, the halo is symmetrically distributed horizontally within the image frames. Alternatively, a headlamp may be modified so that a portion of the light emitted from the headlamp propagates upward and the halo is caused by the portion of light propagating upward. The classification may be performed by applying at least one rule indicating the presence of light scatter above a previously determined threshold. Alternatively, the classification may be performed by previously training a classifier based on known atmospheric conditions of the environment in the vicinity of the vehicle to produce a trained classifier.

The classification is then performed s by applying the trained classifier. The trained classifier may be least one binary classifier or may be based on support vector machines.

According to an embodiment of the present invention there is provided a method for calibrating a camera in a vehicle for use in a driver assistance system. The method is adapted for setting camera orientation and/or camera height parameter. An upright target is placed in the field of view of the camera at a first distance in front of the vehicle. Typically the first distance is zero—the target is placed touching the front bumper centered on the bumper using standard features on the vehicle such as the license plate or the car makers emblem. A first image is captured a first image of the upright target. The upright target is relocated at a second distance in front of the vehicle and a second image is captured of the upright target. Mapping may be performed between image coordinates of the first image to matching image coordinates of the second image. A focus of expansion (FOE) may be computed. A stationary point of the mapping yields the focus of expansion (FOE). When the camera is not laterally centered in the vehicle, the stationary point may be adjusted laterally. Camera height may be computed from the vertical image coordinate of the stationary point and from a height of a point of the target from the ground. Camera roll may be computed based on respective image coordinates of at least two points of the target.

According to an embodiment of the present invention there is provided, a target usable for calibration of a camera in a vehicle. The camera is configured for use in a driver assistance system. The calibration includes setting of a camera orientation parameter and/or a camera height parameter. The target includes a symmetrically repeating pattern of light and dark portions so that when imaged by the camera, the pattern is recognizable in an image of the camera as a series of saddle points. The target optionally includes markings adjacent to the light and dark portions adapted for uniquely identifying the saddle points in the series. The markings preferably uniquely identify the saddle points under rotation of the target in the plane of the target by 180 degrees.

According to an embodiment of the present invention there is provided a camera mount for mounting a camera inside a windshield of a vehicle. The camera includes a lens mount and a camera housing. The front tip of the lens mount is constrained to be in close proximity to or constrained to contact the inside of the windshield for different rake angles of the windshield. A mechanism provides a tilt rotation axis at a point between the lens mount and the windshield. The tilt rotation axis is substantially a horizontal axis. A fixed element is mounted on the inside of the windshield. The mechanism includes a pin through the tilt rotation axis. The pin is adapted to attach to the fixed element and to constrain the front tip of the lens mount to be in close proximity to or to contact the inside of the windshield for different rake angles of the windshield. An arm may be adapted for attaching the fixed element to the camera housing.

Alternatively, an element may be adapted for mounting on the inside of the windshield. The element has a semi-circular cross-section in a vertical plane. The tilt rotation axis is substantially at the center of the semi-circular cross section. The camera housing is disposed between the windshield and the element of semi-circular cross section. The camera housing is adapted to contact the element of semi-circular cross section at a contact point. A surface of the camera housing may be beveled at the contact point to match a contour of the element of the semi-circular cross section. The element having a semi-circular cross-section in a vertical plane is a portion of sphere or portion of cylinder. Optionally, a fastener is adapted for attaching through a slot in the element of semi-circular cross section. The fastener is adapted for constraining the front tip of the lens mount to be in close proximity to or to contact the inside of the windshield for different rake angles of the windshield.

According to the present invention there is provided a method for mounting a camera inside a windshield of a vehicle. The camera includes a lens mount and a camera housing. A tilt rotation axis is provided at a point between the lens mount and the windshield. The front tip of the lens mount is constrained to be in close proximity to or to contact the inside of the windshield for different rake angles of the windshield. A fixed element may be mounted on the inside of the windshield. A pin may be attached to the fixed element for constraining the front tip of the lens or lens mount to be in close proximity to or to contact the inside of the windshield for the different rake angles of the windshield and the fixed element may be attached to the camera housing. An element having a semi-circular cross-section in a vertical plane may be mounted on the inside of the windshield. The tilt rotation axis is substantially at the center of the semi-circular cross section.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein:

FIG. 6b illustrates an example of a calibration target, according to an embodiment of the present invention.

FIG. 6c shows a pattern which may be used for camera heights ranging from 120 cm to about 200 cm.

FIGS. 6d, 6e and 6f illustrate details of calibration targets, according different features of the present invention.

FIG. 7 illustrates schematically a camera and two windshields with different rake angles.

FIG. 7a shows a conventional design of an adjustable camera mount.

FIGS. 7b and 7c show an embodiment of a camera mount according to the present invention.

FIG. 7d show the embodiment of the camera mount of FIG. 7c with a modification

FIG. 7e illustrates a second embodiment of a camera mount, according to an embodiment of the present invention.

FIGS. 7f and 7g illustrates a side view and rear view respectively, of a camera mount according to the embodiment of the present invention of FIG. 7e.

FIG. 7h is a flow chart illustrating a method for mounting the camera behind the windshield according to an embodiment of the present invention; and FIG. 7i, illustrates a camera mount according to another embodiment of the present invention.

DETAILED DESCRIPTION

Figure 1A:
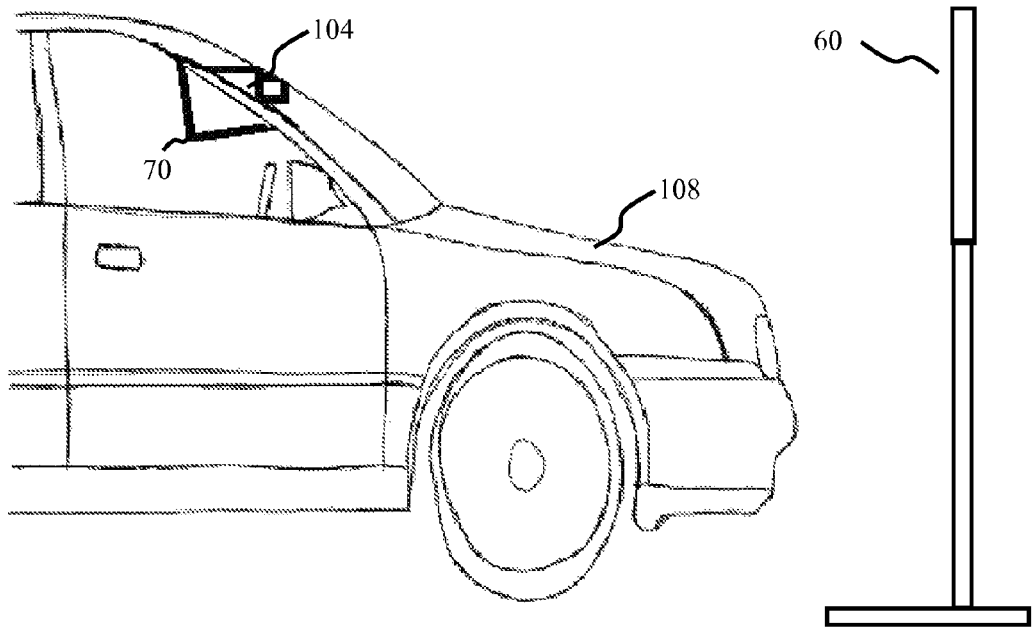
FIG. 1a illustrates a vehicle in which a camera is mounted in accordance with embodiments of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, the present disclosure describes "bundling" of multiple driver assistance systems (e.g. automatic high-beam control (AHC) and traffic sign recognition (TSR), lane departure warning (LDW), forward collision warning (FCW)) on a single hardware platform, e.g. camera and processor. Bundling provides cost reduction and may allow more driver assistance functions to be added to the vehicle without increasing the space required beyond the windshield of the vehicle. Different driver assistance applications have different requirements from the camera, i.e. image sensor and optics. For example, a conventional automatic high-beam control (AHC) algorithm makes significant use of color information and thus requires a color sensor, while lane detection and traffic sign recognition require the extra sensitivity of a monochrome sensor for operation under low light conditions. No single gain/exposure setting is optimal for all applications and in fact, some applications (such as AHC and TSR) may each use more than one gain/exposure setting, according to different features of the present invention.

Figure 1B:
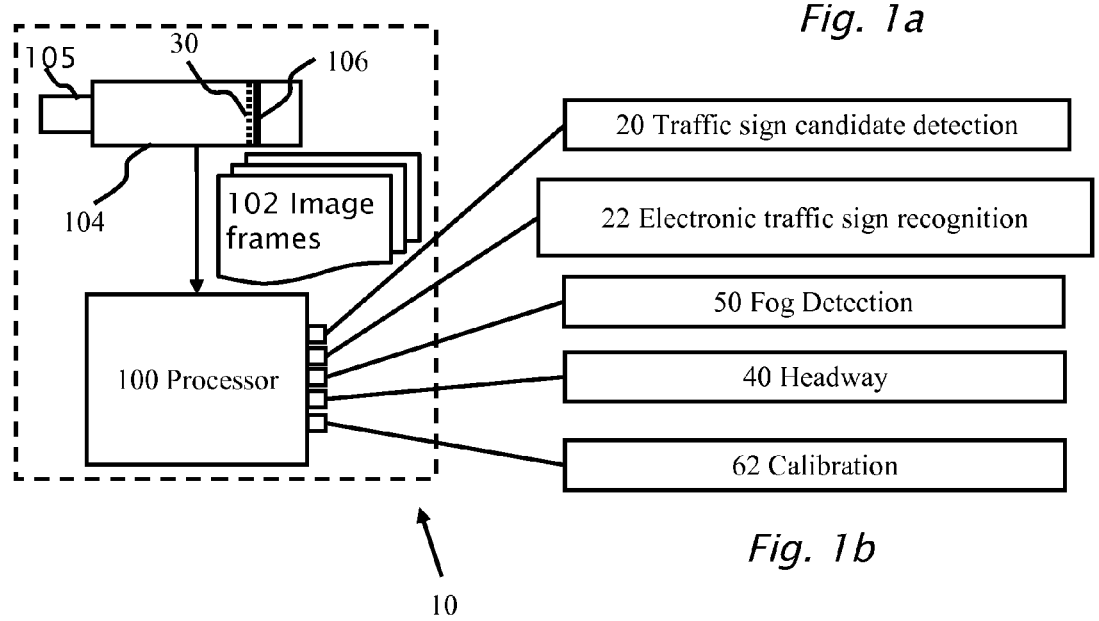
FIG. 1b illustrates the camera of FIG. 1a attached to a processor to provide a hardware platform suitable for bundling driving assistance applications according to embodiments of the present invention.

Referring now to the drawings, reference is now made to FIGS. 1a and 1b which illustrate a driver assistance system according to embodiments of the present invention. FIG. 1a illustrates a vehicle 108 in which a camera 104 is mounted typically just inside the windshield near the centerline of vehicle 108 and close to the rear-view mirror attachment. A camera mount 70, according to embodiments of the present invention facilitates mounting camera 70 in close proximity to the windshield. Referring now also to FIG. 1b, camera 104 is attached to a processor 100 to provide a hardware platform 10 suitable for bundling driving assistance applications according to embodiments of the present invention. Camera 104 includes optics, e.g. lens 105 and an image sensor 106. A patterned, i.e. spatial color filter 30, according to embodiments of the present invention is located in the focal plane of lens 105. Image frames 102 are shown schematically which are transferred from image sensor 106 to processor 100 for simultaneously performing different driver assistance functions, according to embodiments of the present invention. Processor 100 is configured to operate according to a number of algorithms. After mounting, camera 104, a calibration procedure 62 is used to calibrate angular orientation, i.e. pitch, yaw and roll of camera 104, and to find camera height. A target 60 used for the calibration (process 62) of camera 104 is shown in FIG. 1a, according to embodiments of the present invention. Other processes for which processor 100 is configured, according to embodiments of the present invention are: traffic sign detection 20; electronic traffic sign recognition 22, fog detection 50, and a method 40 for determining headway 40.

According to an exemplary embodiment of the present invention. Image frames are partitioned into three slots or partitions so that three image frames (frame 1, frame 2 and frame 3) are captured in sequence with different image capture parameters (e.g gain, exposure time). A complete set of three frames is captured typically in 66 milliseconds. Image frame 1 which has a relatively long exposure is primarily used for lane departure warning (LDW) and vehicle detection. Clear lane marks are detected even in low light conditions. However, the relatively long exposure produces motion blur on traffic signs which makes traffic signs unreadable or unrecognizable. Furthermore, distant oncoming lights tend to have blurred image spots. The outline of a vehicle ahead and the vehicle point of contact with the ground may also be determined using image frame 1, which may then be used to compute distance and time-to-contact according to U.S. Pat. No. 7,113,867 for forward collision warning (FCW). The relatively long exposure of image frame 1 may also be used to detect distant taillights for automatic high beam control (AHC) as disclosed in U.S. Pat. No. 7,566,851 and to detect traffic signs as candidate circles for eventual traffic sign recognition (TSR) as disclosed in US patent application publication US20080137908.

Image frame 2 has a medium exposure and high gain. Image frame 2 has minimal motion blur and may be used for traffic sign recognition (TSR). The gain and exposure settings used for the traffic sign recognition (TSR) image frame 2 may be previously determined or determined dynamically (on-the-fly). Once the outline circle of a traffic sign has been detected and tracked in two images (in any combination of longer exposure image frames 1 and medium exposure image frames 2) it is possible to predict the location and size of the sign in the next image. It is also possible to determine the maximum allowable exposure that will keep the motion blur below a certain limit. The exposure of image frame 2 may be set on-the-fly to keep motion blur is to less than one pixel. In some cases the maximum allowable exposure combined with the maximum gain, give an image which is too bright and the traffic sign is saturated. In order to avoid saturation, brightness of the sign is predicted based on the distance (derived from the image size of the circle), the angle based on the predicted location of the sign in the image and/or the high/low beam status. The gain and exposure are then set accordingly. Further adjustment can be made using closed loop control. Since the image frame 2 uses a high gain, it has significant image noise and not optimal for LDW under low light and/or poorly contrasted lane markings. However image frame 2 does give useful information on well-marked highways and can effectively double the frame rate on such roads which are more typical for fast moving vehicles.

Image frame 3 has a short exposure and may be used together with longer exposure image frame 1 for accurate interpretation of light sources. For example, oncoming headlights of one or more vehicles in image frame 1 appear as a bright cluster of lights. Short exposure image frame 3 of the bright cluster can clearly distinguish the cluster as the oncoming headlights.

Detection and Recognition of Non-Electronic Traffic Signs

Figure 2A:
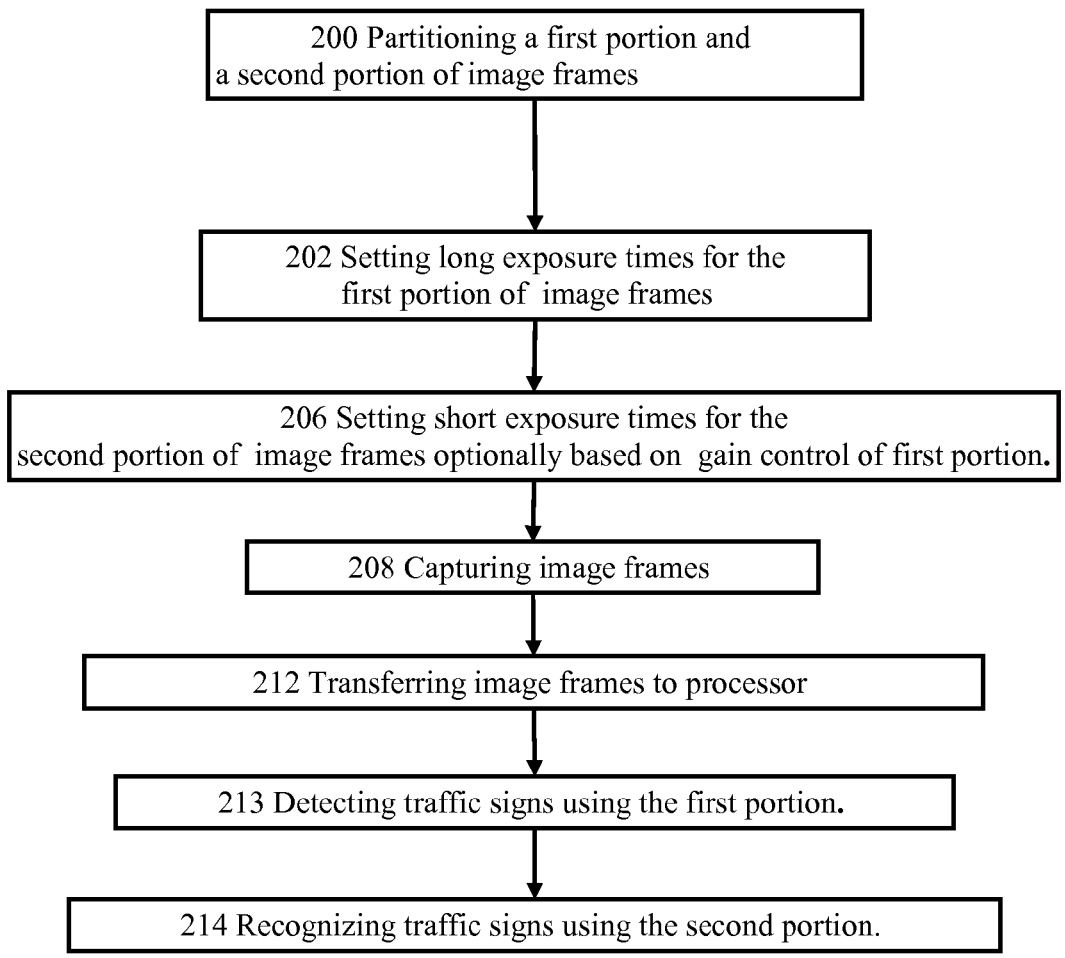
FIG. 2a illustrates a method for detection of and recognition of traffic signs, according to an embodiment of the present invention.

Reference is now made to FIG. 2a which illustrates a method for detection of and subsequent recognition of non-electronic traffic signs, according to an embodiment of the present invention. Image frames from camera 104 are partitioned (step 200) into multiple portions or partitions. Long exposure times are set (step 202) for the first partition and shorter exposure times are set (step 206) for the second partition. Image frames 102 are captured, typically alternating between image frames 102 of the first partition and of the second partition. Image frames 102 are transferred (step 212) to processor 100. Detection of traffic signs is performed (step 213) using the first partition with the longer exposure times and recognition (step 214) of the traffic sign is performed using the second partition of image frames with shorter exposure. Optionally, in step 202 setting exposure times or gains for first partition of image frames 102 is achieved using a gain control, and exposure times (or gains) are set in step 206 for the second partition based on the controlled parameter of the first partition.

Detection and Recognition of Electronic and Non-Electronic Traffic Signs

Figure 2B:
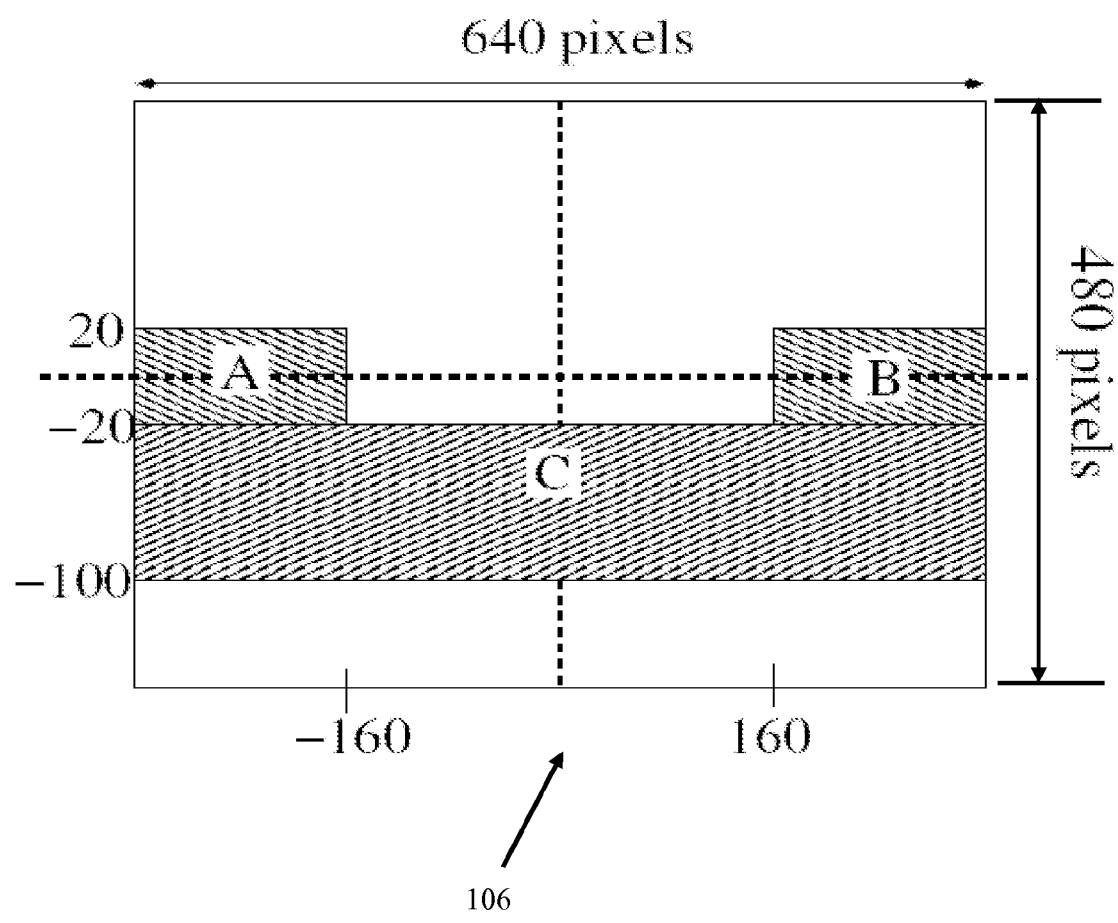
FIG. 2b illustrates an image sensor, according to a feature of the present invention.

The light emitting diodes (LEDs) of pulsed electronic traffic signs are not on all the time but are pulsed on and off at a frequency of typically 80-160 cycles/sec Hertz (Hz.). The frame exposure time may be selected so as not to oversaturate the image of the electronic traffic sign but still capture the full cycles of the switching light emitting diodes (LED). LED frequency, duty cycle and intensity vary from sign to sign. The operating parameters of pulsed electronic traffic signs may vary from country to country and even may vary according to the time of day and ambient light levels. However the cycle time of most or all LED signs is longer than about 6 milliseconds and less than about 11.4 milliseconds. Reference is now made to FIG. 2b which illustrates image sensor 106, according to a feature of the present invention. Camera 104 is previously aligned in vehicle 108 so that image regions (A, B and C) of image sensor 106 are imaged in image frames 102. Region C includes an image of the road region (immediately in front of vehicle 108), regions A and B image the sides of the road region where electronic signs are possibly located. Image sensor 106 has two main parameters that affect the image brightness: exposure (also known as integration time) and gain.

Figure 2C:
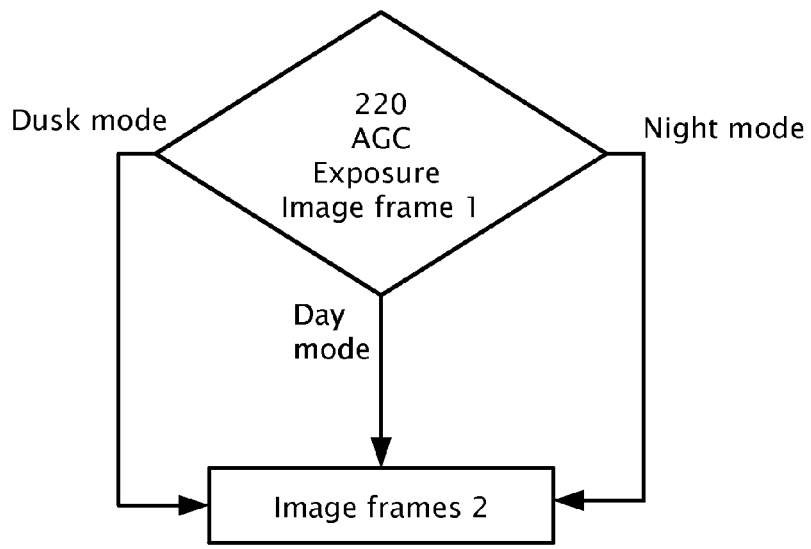
FIG. 2c illustrates, a method of setting camera parameters in a second partition of image frames based on a gain control in a first partition of the image frames, in accordance with embodiments of the present invention.

Reference is now made to FIG. 2c which illustrates a feature of the present invention, a method of setting camera parameters in a second partition of image frames, e.g. image frames 2 based on a first partition, image frames 1 for example using the AGC of image frames 1.

To accommodate recognition for the various electronic signs and the operating environments of the electronic signs, the exposure/gain control of camera 104 has different algorithms (executed by processor 100) and settings for day, dusk and night operation. For instance, in decision box 220 the decision of processor 100 between day, dusk and night modes of image frames 2 is optionally based on the exposure/gain parameters of another image frame, typically image frame 1 or time-to-lane crossing (TLC) frame used in LDW. A classic automatic-gain-control (AGC) algorithm may be used for image frame 1 so that a certain percentage of pixels in a specified image region (e.g. A, B and/or C) are within a certain value range. Typically for time-to-lane crossing (TLC) image frame 1, the gain and exposure is set so that 93% of the pixels in the regions A, B and C are below a value of 144 (out of 155).

Image frame 1 automatic gain control (AGC) is designed to keep the gain as low as possible and exposure is increased first to a maximum of about 40 milliseconds. When the exposure of image frame 1 based on the automatic gain control is above 6 milliseconds processor 100 specifies 'dusk' mode for image frame 2 and when the exposure passes 30 milliseconds processor 100 specifies 'night' mode. There is typically no hysteresis specified in the exposure thresholds but the exposure of image frame 1 preferably specifies a new setting for at least 50 frames before switching from day mode to dusk mode or dusk mode to night mode.

Day Mode

During the day mode, the automatic high beam control (AHC) algorithm is not active and image frame 3 allocated (at night) for the automatic high beam control (AHC) algorithm may be used by the traffic sign detection and recognition algorithm in the day. During the day, the traffic sign detection and recognition algorithm typically controls the exposure and gain settings of image frame 3. During the day, image frame 1 may also be used by traffic sign detection and recognition algorithm but the exposure and gain are optimized for lane departure warning.

Figure 2D:
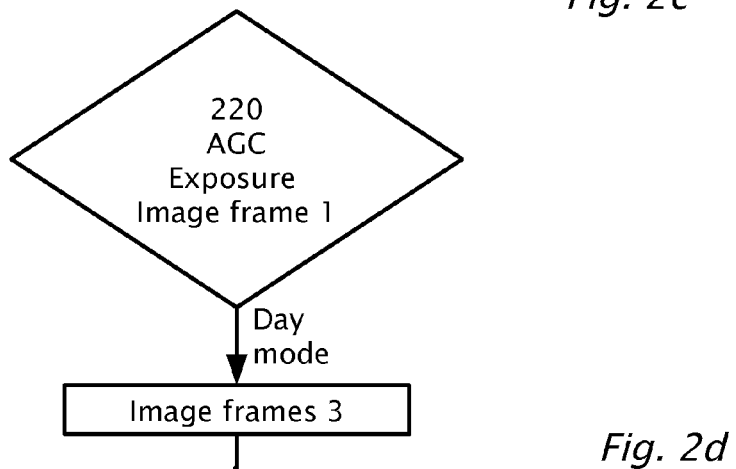
FIG. 2d, illustrating a method of traffic sign recognition and detection according to an embodiment of the present invention.
Figure 2D:
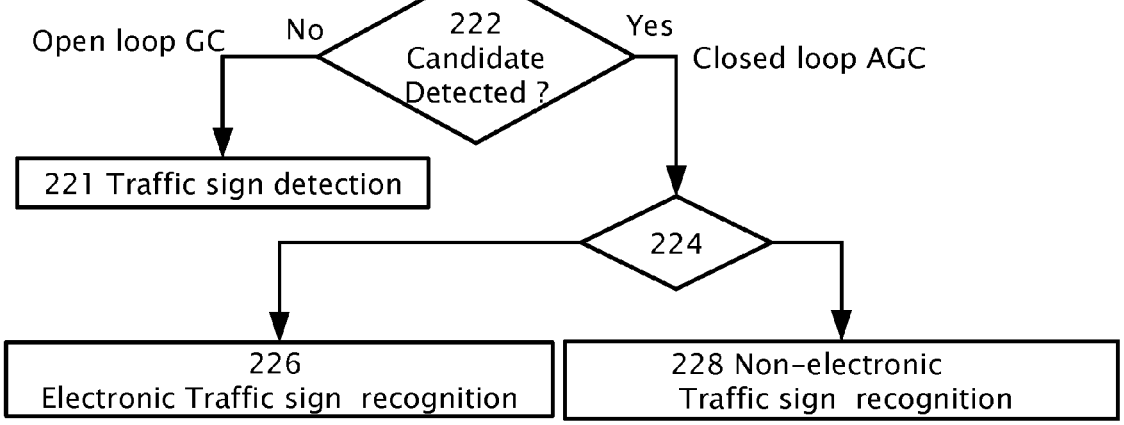

Reference is now made to FIG. 2d, a method illustrating traffic sign recognition and detection according to an embodiment of the present invention.

The gain control (GC) of image frames 3 during the day has two modes of operation shown in decision box 222. In the first mode, for traffic sign detection (step 221) when the system is looking for candidates (typically circles of the appropriate size and location) of traffic signs an open loop gain control is used. The second mode called closed loop AGC is used to optimize the exposure for verifying and recognizing (steps 224, 226, 228) the particular sign. Even though the objects we are looking for (traffic signs) are above the horizon we perform gain control in the first mode based on road region C because the area of the image above the horizon varies significantly in brightness due to the background (e.g. mountains, buildings or sky). The brightness of the road surface (region C) is generally a much better indicator of the general illumination. This was a non-obvious discovery: that the AGC for TSR is best performed based on the road and not on the regions where traffic signs are likely to be found. The gain control algorithm for traffic sign detection (step 221) candidate search is similar to the AGC (step 220) used for the LDW frame (image frame 1) but with different parameters even though they both use road region C. Exposure settings are selected so that 93% of the pixels are below 128 (out of 256). The above setting works well in most cases. However if the road surface appears washed out due to low sun in front, the algorithm parameters are adjusted and the exposure is set so that 30% of the pixels are below a value of 111. The already bright road is nearly totally saturated. However, this may be an optimal setting for detecting traffic signs in this situation, since the traffic signs, with the illumination from behind, are self-shadowed and appear very dark. When the sun is low but behind the car, the road also often appears very bright and washed out however in this case the traffic signs are illuminated from the front and the illumination is not increased further. To detect the particular situation of bright roads due to low sun, histograms of the two small regions 'A' and 'B' are compared to the histogram of the road region C. If the low sun is behind, then the image above the horizon is bright. If the low sun is in front, then the image above the horizon is dark. The actual comparison is done by running an SVM classifier on the 32 bin histogram values of the 3 regions together with the exposure and gain settings of the current image, the average brightness of the pixels above the regions A, B and C and the average brightness of the pixels below the region C.

Up to here the AGC used is for both electronic and non-electronic traffic signs. After detection different strategies are used for the electronic and non-electronic traffic signs. Once a circle candidate is detected (decision box 222) the system is switched to a closed loop AGC. There are two types of closed loop AGC for daytime: one is for regular non-electronic sign recognition (step 228) and one for electronic traffic sign recognition 226. So we first check in decision box 224 if the detected candidate is a non-electronic sign or electronic sign and choose the correct closed loop AGC algorithm. Electronic signs are typically bright. To test for an electronic sign in the daytime, we first require that a certain percent of pixels are above a certain threshold (e.g. in saturation). For example we require that 25% of the pixels inside the candidate circle are in saturation. If the candidate passes this first test we run an SVM classifier trained on candidates that were electronic signs and candidates that were regular signs as a negative training set or 'falses'.

Closed Loop AGC for Daytime:
Non-Electronic Traffic Sign:

The gain and exposure to bring the median value of the pixels inside the square bounded by the candidate circle to be 150.

Electronic Traffic Sign:

The electronic sign typically flickers although the duty cycle is typically quite high in daylight. All three image frames (image frame 1 (LDW), image frame 2 (TSR) and image frame 3 (AHC) are used with different exposures. The TSR frame gain and exposure is set as for day closed loop AGC. Image frame 1 (LDW) frame uses the settings optimized for LDW. Image frame 3 is set to an exposure of 1.5 milliseconds unless either the LDW or TSR frames are set to exposure of anything between 1.2 milliseconds and 1.8 milliseconds. In that case, the image frame 3 (AHC) is set to 3 milliseconds.

Night Mode:

In 'Night Mode' the automatic high beam control (AHC) algorithm is active and the gain and exposure settings for the automatic high beam control (AHC) image frame 3 are set by the automatic high beam control (AHC) algorithm. These are optionally a fixed cycle of four exposure settings {6 ms 0.75 ms 3.9 ms 0.75 ms}. The gain is set to 1. The automatic high beam control (AHC) image frame 3 may also be used by the traffic sign recognition (TSR) algorithm. The traffic sign recognition (TSR) frame, image frame 2 is running at a fixed exposure of 13.5 milliseconds and gain of 4. Once we detect a traffic sign (typically a saturated bright circle) we first determine if it is likely to be an electronic sign or a regular non-electronic sign and apply the appropriate automatic gain control (AGC). We should note that at night there are many bright circular images: not just electronic signs and regular signs but also light sources such as headlights and taillights and even some street lights. Once we have detected a round saturated circle in the traffic sign recognition (TSR) frame (image frame 2) we look in the automatic high beam control (AHC) frame (image frame 3) which has shorter exposure. In the shorter exposure we would start to see the texture inside the electronic sign which is distinct from a regular sign or a light source. The respective locations in image space in current traffic sign recognition (TSR) frame 2 and previous traffic sign recognition (TSR) frame 2 may be used to interpolate and get a position in automatic high beam control (AHC) frame 3. A classifier (SVM) may be used based on the raw intensity image to differentiate between a light source, a non-electronic traffic sign and an electronic traffic sign. If the candidate is classified as a likely non-electronic traffic sign or electronic sign the appropriate closed loop automatic gain control (AGC) is used. If more than one likely sign is detected optimization may be selected for the largest candidate detected, since this would indicate that it is likely to be the closer traffic sign. If no candidate was classified as a likely sign traffic sign recognition (TSR) exposure parameters are maintained at the fixed value of 13.5 milliseconds with gain equal to 4.

Closed Loop Automatic Gain Control (AGC) for Nighttime:
1. Non-Electronic Traffic Sign at Night:

The traffic sign recognition (TSR) frame settings are now optimized for recognition of non-electronic signs. The gain and exposure settings used for the traffic sign recognition (TSR) frame (image frame 2) are determined dynamically. Once the outline circle of a traffic sign has been detected and tracked in two images (any combination of long exposure frames and traffic sign recognition (TSR) frames) it is possible to predict the location and size of the sign in the next image frame. It is also possible to determine the maximum allowable exposure that will keep the motion blur below a certain limit. Motion blur is typically kept to less than one pixel.

In some cases the maximum allowable exposure combined with the maximum gain, give an image which is too bright and the traffic sign is saturated. In order to avoid this situation, the brightness of the sign is predicted based on the distance (derived from the image size of the circle), the angle based on the predicted location of sign in the image and the high/low beam status. The gain and exposure are then set accordingly. This can typically be done for OEM serial production where the type of headlights and windshield glass is known.

Further adjustment can be made using closed loop control. If we have a likely non-electronic sign which is overly saturated, gain and/or exposure are adjusted to a lower setting. For example, for exposure time 9 milliseconds and gain 3 gives half of the brightness of the standard exposure of 13.5 milliseconds and gain 4.

At night, the automatic high beam control (AHC) frame is typically also used for non-electronic traffic sign recognition and a traffic sign recognition classifier is run on all image frames 1, 2 and 3.

2. Electronic Traffic Sign at Night:

Electronic signs are quite bright and the brightness of their images is not affected by the cone of illumination of the vehicle headlights. According to features of the present invention the full LED cycle is captured and an image is required which is not over saturated. LED frequency, duty cycle and intensity vary from sign to sign. The cycle time of all LEDs is smaller than 11.4 milliseconds and longer than 6 milliseconds. However an exposure of 11.4 milliseconds, even with minimal gain, sometimes leads to saturation. If the exposure time for all image frames is uniformly decreased to 4.5 milliseconds or less there may be frames where the sign is not captured.

According to an aspect of the present invention, one or more of the image frame partitions is sub-partitioned into multiple exposure settings. One or more of the frames is toggled between different settings. In a frame triplet when the automatic high beam control (AHC) image frame 3 uses a short exposure setting, a longer exposure is used for traffic sign recognition (TSR) image frame 2 and vice versa. For example: image frame 3 (AHC) is cycled between four exposure times of {6 ms 0.75 ms 3.9 ms 0.75} and image frame 2 traffic sign recognition (TSR) is cycled. {1.5 ms 9 ms 0.6 ms 6 ms} The frame 2 exposures are thus set to compliment the frame exposures to ensure a short exposure and a medium exposure in each frame triplet.

Some back illuminated signs (such as in tunnels) are not LEDs and require very short exposure (0.75 milliseconds). If the AGC is in the night Electronic sign mode there is an appropriate exposure frame every triplet. However, back illuminated signs are often not classified as electronic signs and the AGC is in night non-electronic sign mode. In this case, it is the short automatic high beam control (AHC) image frames 3 that give the correct classification.

Dusk Mode

The typical dusk scene has the following characteristics:
Scene is sort of lit (day like). The AHC function is not active and the AHC frame slot image frame 3 may be controlled by the traffic sign recognition algorithm.
Cars are switching on lights
LED duty cycle changes.

If we are in 'Dusk Mode', as determined by the LDW frame exposure (decision box 220 in FIG. 2c) the TSR frame (image frame 2) settings are adjusted using the AGC day algorithm. This is a typical scenario where we will have to deal with low light from in front. We set the AHC frame (image frame 3) to exposure 6 milliseconds and gain 1. Since the duty cycle of electronic signs during dusk is still quite long the exposure of 6 milliseconds is good at catching the electronic signs without saturating. Both the TSR (image frame 2) and AHC (image frame 3) frames are used for classification.

Optical System

Camera 104

Reference is now made again to FIG. 1b which illustrates a camera system 10 including camera 104 connected to and passing image frames 102 to processor 100. Camera 104 includes lens 105, image sensor 106 and a focal plane filter 30. Camera 104 orientation may be centered around the horizon as a compromise since the for traffic sign recognition a small upward tilt may be preferred for better detection of overhead signs, however an upward tilt is unacceptable for lane departure warning. The camera height is typically about 1.2 meters above the ground.

Sensor 106

A sensor appropriate for embodiments of the present invention is a wide VGA sensor with resolution 752×480. Sensor 106 has a 6 µm×6 µm square pixel. It has a global shutter and can switch exposure and gain settings every frame. One unusual aspect of camera is that it includes focal plane filter 30 with only red and clear pixels. The red pixels are arranged as they would be on a standard Bayer pattern but the green and blue filters are missing. This is done in order to combine most of the advantages of the monochrome sensor in terms of low light sensitivity and sensor 106 resolution with some color information; in particular, the ability to distinguish between red and white lights.

Lens 105

The lens example discussed is a 5.7 mm lens with a low F number F1.6 5.7 mm (e.g. Marshall Electronics Inc., El Segundo, Calif.). An infra-red (IR) cutoff lens filter may be used to give a consistent response with a variety of windshields whose transmittance characteristics in the IR spectrum can vary widely. The lens filter selected is an IR cutoff filter with the 50% cutoff set at 700 nm rather than the typical 650 nm. This lens filter lets in more light and increases the low light performance in detection of lanes and traffic signs under halogen headlights in particular and also increases the detection range for red taillights.

The sensor 106/lens 105 configuration in camera 104 gives a field of view of 0.06° per pixel or 45°×29° over whole sensor 106. However due to assembly tolerances we will only assume that 640×400 pixels are available giving an effective field of view of 39°×24°. Once sensor 106 and lens 105 have been fixed it is often convenient to specify the lens focal length (F) in pixels, e.g. F=950 pixels.

Cyan/Yellow/Magenta (CYM) Filter 30

While the red/clear filter focal plane filter 30 works well, there are applications that could benefit from the full 3-dimensional color space. For example to determine traffic light colors—green, yellow and red, or to expand the range of traffic signs that can be detected; for example, to differentiate between yellow (recommended) and white (obligatory) speed signs in North America. Color information could also be used for classifying lane marking types (white, yellow, orange and blue are typical some examples). In fact, without color information, some lane mark color and road surface configurations make the lane marks invisible or with very low contrast when imaged in monochrome. These can be enhanced using a particular color filter over the whole image but the choice of filter would be region specific. The red channel of the red/clear sensor can help in enhancing the lane marks in such case however the lane mark color is hard to determine. To make a truly universal system a color sensor is appropriate. However, a standard red/green/blue (RGB) sensor is not recommended since the green channel is much less sensitive than the monochrome channel harming both LDW and TSR performance in low light conditions. A yellow filter (from 520 nm and up into the NIR) gives a stronger response combining the response of both the green and red filters in the RGB sensor. Since halogen head lights are actually quite yellow in color and have only little energy in the blue part of the spectrum, the difference between the response of a monochrome camera to that of a monochrome camera with a yellow filter is small.

Newer xenon or high intensity discharge (HID) lamps have a stronger blue component so there is noticeable drop in sensor response with the added yellow filter. However these headlights are so much brighter in general than the older halogen headlights that even with the yellow filter the response is strong enough. In fact, with HID headlights, even an RGB sensor can be used for LDW and TSR. The new LED technology also falls into this second category. In order to make best use of the available light energy from the halogen headlights it is important to capture light also in the NIR region. So a near infrared (NIR) cutoff filter, if used at all, should have a cutoff at 750 nm or even 800 nm. Typical automotive windshield glass has a NIR cutoff characteristic however it usually only reduces near infrared transmittance to 30%. Newer and more expensive glass filters the NIR transmittance down to 10%, however this glass is usually on high end vehicle where HID headlights are used and scene brightness is not an issue. The yellow filter has the added advantage that it enhances the contrast, in daytime, between yellow lane markings and the concrete road surface often used in the USA. Understanding that yellow is the best color filter to use for low light situations, leads to the idea of using a CYM (Cyan, Yellow and Magenta) instead of the standard RGB. Reference is now made to FIGS. 3c and 3d which schematically show two examples of the color pattern of CYM focal plane filter 30, according to embodiments of the present invention. The yellow portion (Y) replaces the green in the standard Bayer pattern so the yellow portion has the maximum resolution using half of the pixels. The remaining pixels alternate between magenta (M) and cyan (Y). However a standard CYM filter is preferably modified, according to an exemplary embodiment of the present invention.

Figure 3A:
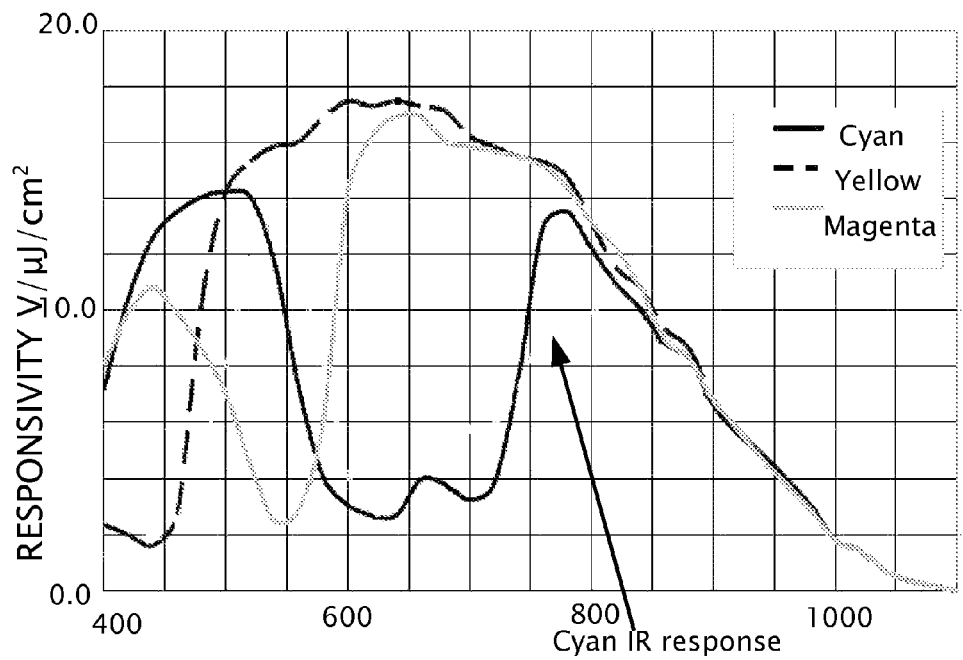
FIG. 3a illustrates a graph of responsivity of cyan, magenta and yellow portions of a conventional CCD image sensor.
Figure 3B:
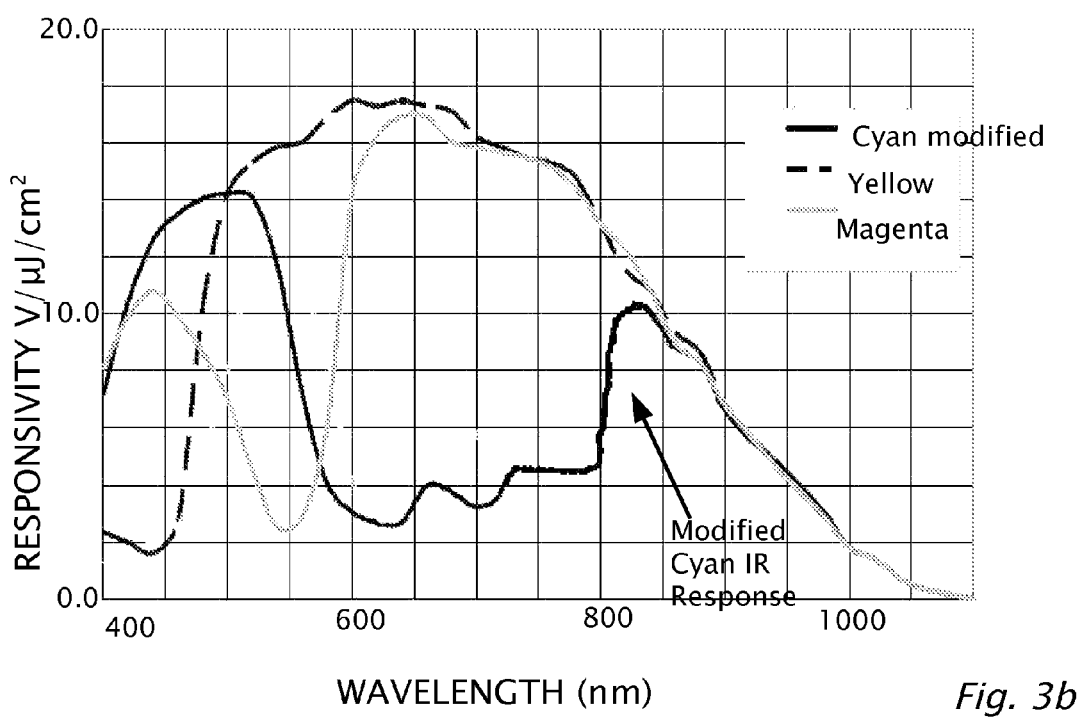
FIG. 3b illustrates a graph of responsivity of the modified cyan portion of CCD image sensor, in accordance with a feature of the present invention.
Figures 3C, 3D:
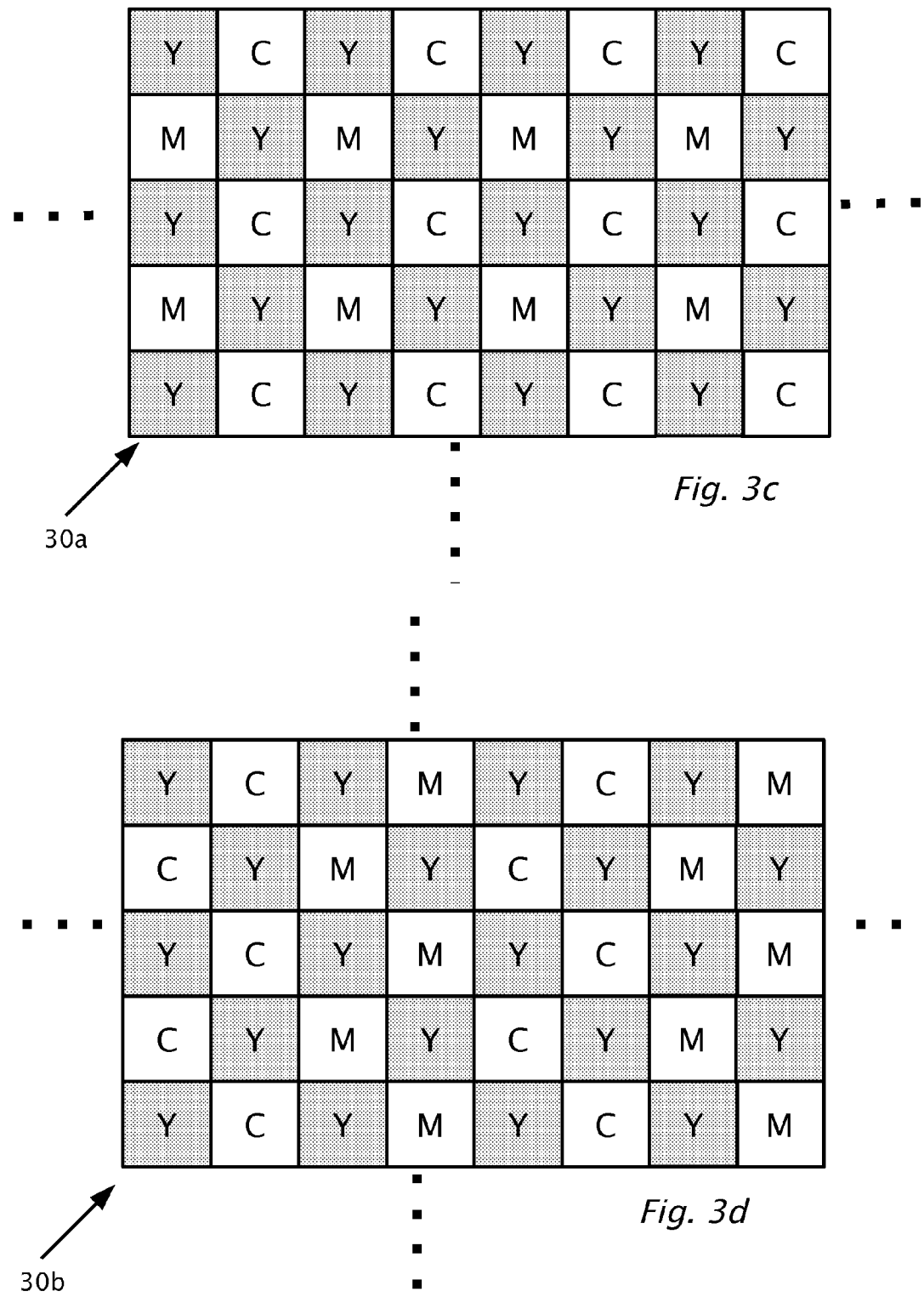
FIGS. 3c and 3d illustrate schematically two examples respectively of a CYM filter modified according to features of the present invention.

Reference is now made to FIG. 3a which illustrates a graph of responsivity (V/μJ/cm$^2$) of a CCD image sensor TC246CYM-B0 (Texas Instruments Inc.) as a function of wavelength in nanometers. While the cyan portion filters out the red part of the spectrum it has noticeable NIR response above 750 nanometers. Near infra-red response of the cyan filtered image sensor is marked with an arrow. The significant response with the standard cyan filter above 750 nanometers means that a red tail light gives a noticeable response on the cyan pixels and can not typically be differentiated from white headlights. This drawback which we noted in standard CYM sensors is not typically noticed since color cameras typically have an additional filter which cut out most NIR above 650 nm. Thus, for a standalone AHC application a standard CYM filter would be suitable. However when combining with other applications such as LDW and TSR currently available CYM sensors are not preferably used since these applications preferably use response of the yellow channel to NIR. Therefore, according to a feature of the present invention the cyan filter as used in standard CYM filters is preferably modified so that it blocks out or significantly reduces the NIR from 750 nanometers to at least 800 nanometers. A graph of responsivity with a modified cyan filter, according to a feature of the present invention is shown in FIG. 3b. An arrow points to the responsivity as measured through the modified cyan filter, according to a feature of the present invention using the same image sensor as used for the responsivity shown in FIG. 3a. For an absorbing filter, the filter may be modified by adding a pigment such as iron which is used to absorb NIR in standard automotive glass. For a reflective dichroic filter a dielectric layer design with several non-absorbing dielectric layers are typically used. In the example of FIG. 3a, the minimal cyan IR response is up to about 800 nanometers. The wavelength range of minimal cyan IR response may be extended to 900 nanometers, 1000 nanometers or more.

Modifying the Color Matrix Values to Account for More NIR

In some applications the there is a desire to display the images to the driver in some form. This might be the case for a backup display or an all-around-view application.

With the modification of the cyan filter, significantly more NIR reaches the sensor the image will have a strong yellow tint if standard color matrix values are used to convert to RGB for display. It is quite easy to manually tune the color matrix values for each scene so as to give good color rendering however these matrix values will require retuning when the light source changes spectrally. In particular, settings suitable for daylight are not suitable for a scene illuminated with halogen lights with a spectrum skewed much more towards NIR. According to an embodiment of the present invention, switching is performed between multiple color matrices according to light level as measured by the camera and other information such as time and/or place typically available on the car network.

Using Monochrome Data to Train a Classifier to Work with a CYM Sensor

The Mobileye AWS 4000 system uses a monochrome sensor. The algorithm uses, among other algorithms, various classifiers which were trained using hundreds of thousands of training samples. Accumulating such a large database of much time and effort. In order to avoid having such an effort going to waste when switching to the CYM sensor the same examples are reused. It should first be noted that the images captured from a monochrome camera or from a monochrome camera with a yellow filter are very similar. The differences are negligible. However when using the CYM color filter array the response of the cyan and magenta pixels will be different from the yellow pixel response creating spurious edges. Given that the color of the viewed object is not known the cyan and magenta values cannot be adjusted automatically to give the correct yellow response. The solution is to use only the yellow pixels as input to the classifier. The values at the cyan and magenta pixel locations are interpolated based on the yellow neighboring pixels. These images will still appear different from the images obtained from the monochrome sensor however they can correctly be simulated from the monochrome data. As a training set for the classifiers using the CYM sensor we use the monochrome images where we interpolate in a checker board fashion. We use the 'white' pixels as is and interpolate the 'black' to get one example image and then use the 'black' to interpolate the 'white' to get a second example image.

Computing Headway

The term "headway" as used herein refers to the time it takes a host vehicle to reach the preceding vehicles current position. The term "headway distance" as used herein refers to the distance from the front of the host vehicle to the preceding vehicle's current position. Maintaining a safe headway distance is a key element of driving safety. Since a safe headway distance is related to vehicle speed, headway is typically in seconds or distance/speed. However computing headway based on distance/speed requires good estimates both of distance and vehicle speed. The distance can be estimated from an image stream obtained from a monocular camera. The vehicle speed may be obtained by connecting to the vehicle controller area network (CAN) bus or by connecting directly to the speedometer analog signal. However, both methods for obtaining the speed require a professional installation. It would be advantageous for an after-market product to avoid having to use professional installation.

Figure 4A:
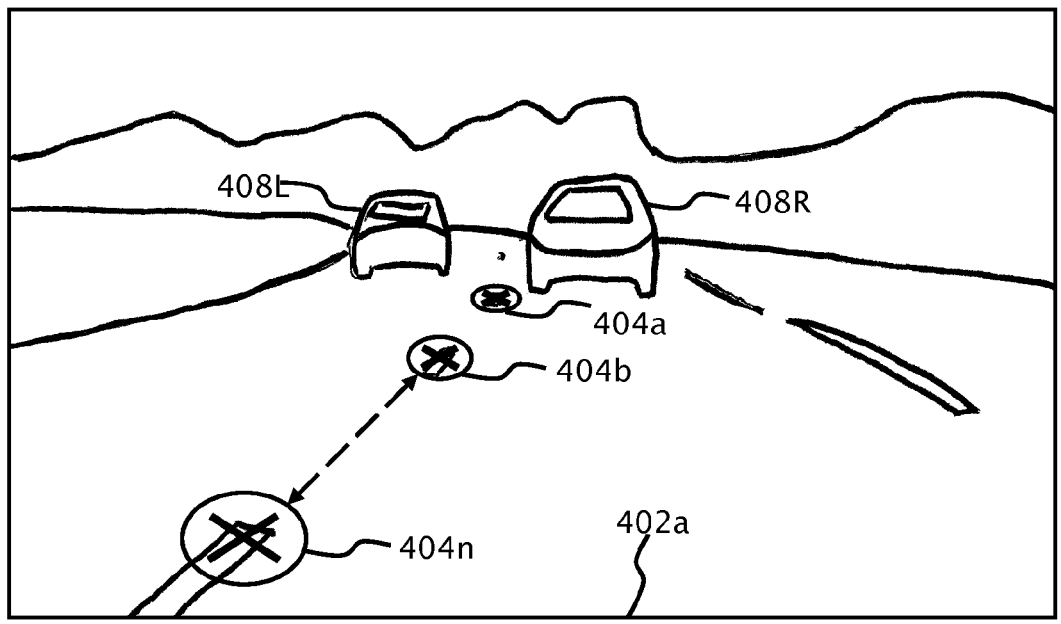
FIG. 4a shows a forward view from the camera mounted inside host vehicle illustrating headway computation according to an embodiment of the present invention.

Reference is now made to FIG. 4a which shows a forward view 402a from camera 104 mounted inside host vehicle 108 (FIG. 1a) according to an embodiment of the present invention. Camera 104 is preferably a monocular camera mounted close to the rear mirror, looking forward out through the windshield of host vehicle 108. Forward view 402a shows two vehicles 408L and 408R in two lanes and the progression of a feature 404a-404n (behind vehicles 408) in the road surface for successively captured image frames 102. Examples of features 404a-404n in the road are typically the end of a lane mark segment, shadows or tar seams.

One method to determine headway is to estimate the distance of vehicle 408R ahead and then divide by the speed of host vehicle 108. This will give the time it takes host vehicle 108 to reach the current position of vehicle 408R.

Figure 4B:
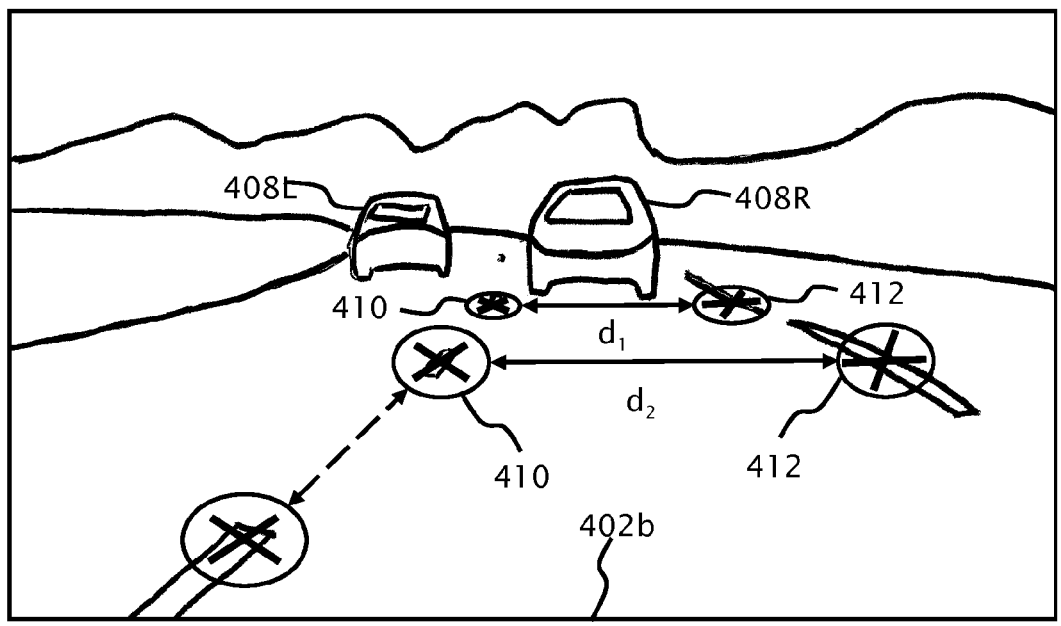
FIG. 4b shows another forward view from the camera mounted inside host vehicle illustrating another embodiment of headway computation, according to an embodiment of the present invention.
Figure 4C:
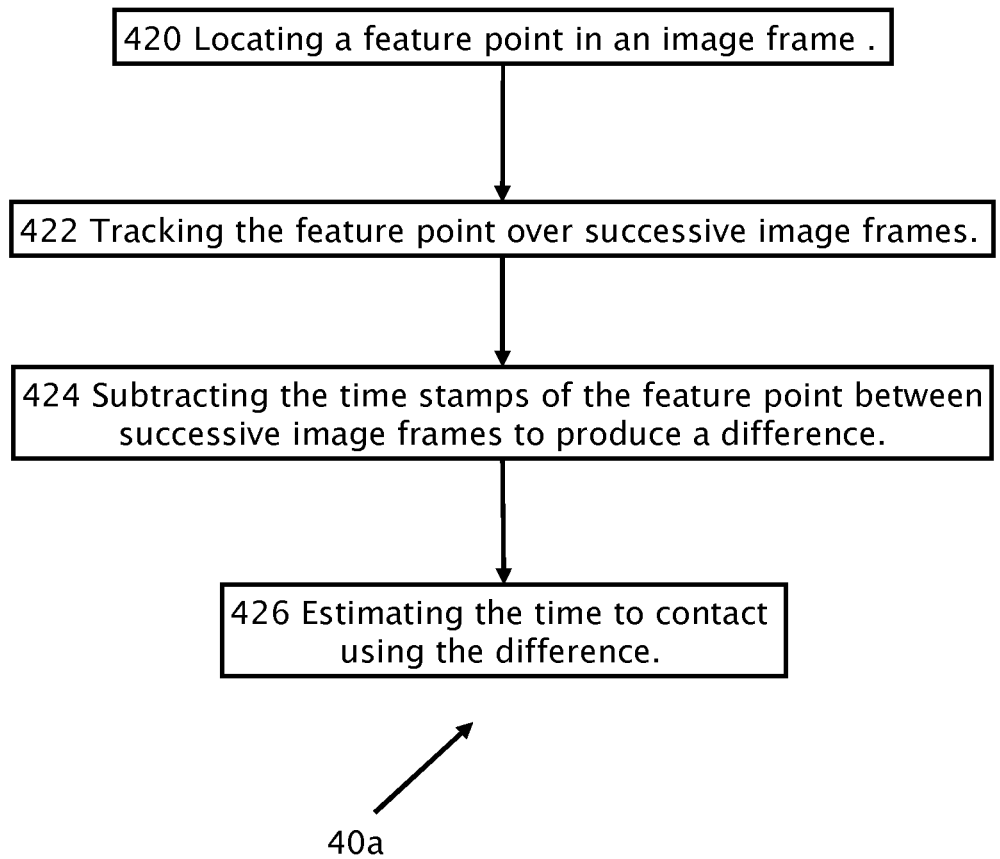
FIG. 4c illustrates a method for determining headway, according to an embodiment of the present invention without having or requiring speed of host vehicle.

Reference is now also made to FIG. 4c showing a method 40a for determining headway, according to an embodiment of the present invention without having or requiring speed of host vehicle 108. Method 40a is implemented by an algorithm in processor 100 which determines the time for host vehicle 108 to reach the current position of preceding vehicle 408R. Method 40a locates (step 420) a feature point 404a on the road surface that is on the same horizontal image line as the bottom of preceding vehicle 408R. At this point in time, feature point 404a on the road and the preceding vehicle 408R are at the same distance from host vehicle 108. Feature point 404a is then tracked (step 422) in the next few frames (the same feature point now labeled 404b in FIG. 4a) till the bottom of the image frame 102 is reached i.e. feature point 404n. The time stamp of the first image frame 102 showing feature point 404a is then subtracted (step 424) from the time stamp of the image frame 102 where the feature point 404n has reached the bottom of image frame 102. The subtraction (step 424) between the time stamp of the first image frame 102 and the time stamp of the image frame 102 where the feature point 404n has reached the bottom of image frame 102 gives an estimate (step 426) of the headway in seconds.

It is preferable to use a scale invariant feature transform (SIFT) features for tracking (step 422) features. Since these features encode scale invariant information they are well suited for tracking features on the road as they grow bigger. When tracking features on periodic structures (such as dashed lane markings) a fast frame rate is preferably maintained for frames 102 to avoid aliasing.

Referring back to FIG. 4a, camera 104 is positioned inside host vehicle 108 and mounted close to the rear-view mirror, viewing in the forward direction through the windshield of host vehicle 108. The tracked feature point 404n leaves the image frame when the feature point is in fact a few meters in front of host vehicle 108, a fact which adds inaccuracy to the estimated headway (step 426). Moreover, a wait of a few seconds may be needed until the headway estimate is obtained (step 426); by then the distance to the preceding vehicle 408R or the speed of the host vehicle 108 may have changed. A wide angle camera may be mounted at the front of vehicle 108 so that in typical situations, the correct distance to the preceding vehicle 408R is resolved.

Reference is now made to FIG. 4b which shows another forward view 402b from camera 104 mounted inside a host vehicle 108 according to another embodiment of the present invention. Forward view 402b shows two vehicles 408L and 408R in two lanes and the progression of two pairs of features 410 and 412 (behind vehicle 408R) in the road surface for successively captured image frames 102.

Typically features 410 and 412 in view 402b are provided from one dashed lane marking and one solid lane marking respectively. If both lane markings are dashed then the horizontal line extending from a feature detected lane mark might not intersect a lane mark segment on the other side. In that case the intersection point of the horizontal line and a line joining the end points of two lane mark segments is used.

A substantially horizontal distance $d_1$ separates features 410 and 412 and a substantially horizontal distance $d_2$ separates features 410 and 412 in successively captured image frames 102. Examples of features 410 and 412 in the road are typically the end of a lane mark segment, shadows or tar seams.

Figure 4D:
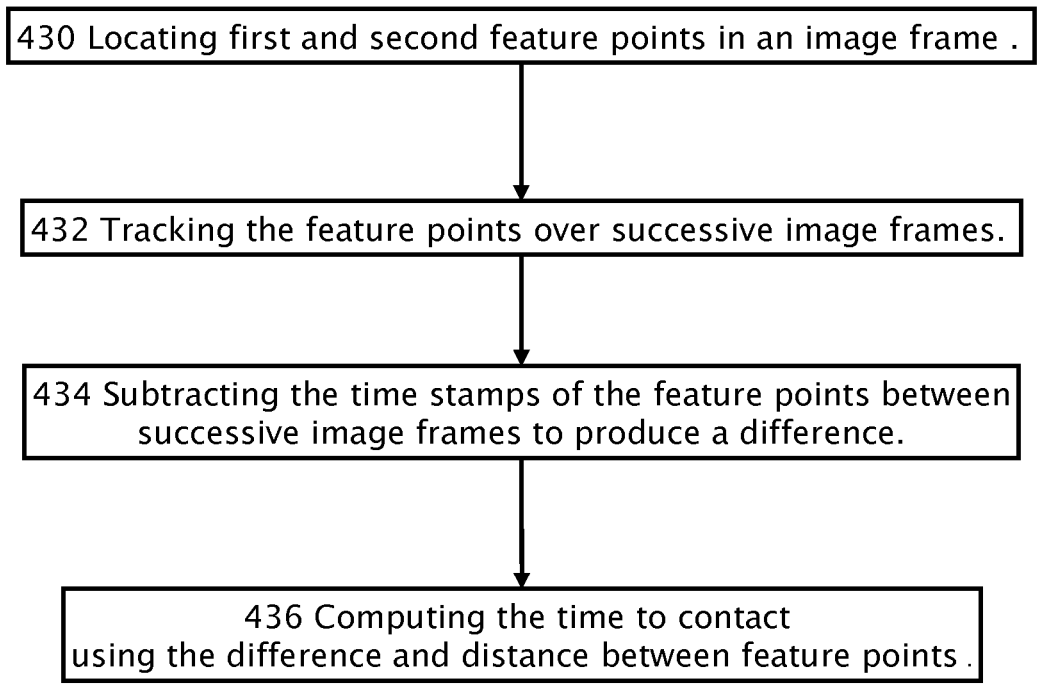
FIG. 4d illustrates another method for determining headway, according to an embodiment of the present invention without having or requiring speed of host vehicle.

Reference is now also made to FIG. 4d showing a method 40b, according to another embodiment of the present invention. Method 40b first locates (step 430) a feature point 410 on the road surface that is on the same horizontal image line ($d_1$) as the bottom of the preceding vehicle 408R. At this point in time the feature point 410 on the road and the preceding vehicle 408R are at the same distance from host vehicle 108. A second feature point 412 is located (step 430) along the same horizontal image line ($d_1$) as the bottom of the preceding vehicle 408R. Typically, linear features such as a solid lane mark are used for providing the second feature point 412 since only the horizontal location of the second feature point 412 is needed. Typically both features 410 and 412 are tracked (step 432) in every captured image frame 102. From tracking (step 432), image distance (for example $d_1$) between the two features (features 410 and 412) can be determined. From the change in image distance (i.e. $d_1$ compared to $d_2$), the time-to-contact ($T_{ttc}$) can be estimated. In effect, a forward collision warning (FCW) is being determined not from vehicle 408R ahead but from distance $d_1$, where the host vehicle 108 is in the current image frame 102, hereinafter the first image frame.

Once the first image frame is produced both feature points 410 and 412 are tracked (step 432) in the next few image frames 102 until the change in distance between successively tracked feature points 410 and 412 is significant (for example if the size of feature points 410 and 412 doubles). Image frame 102 that produces the situation where the distance between successively tracked feature points 410 and 412 is significant is known as a second image frame.

Once the second image frame is obtained, the time stamp of the first image frame is subtracted (step 434) from the time stamp of the second image frame. The subtraction between the time stamp of the first image frame and the time stamp of the second image frame is known as the time difference ($\delta T$). The time to contact ($T_{ttc}$) is then computed (step 436) using:

$$T_{ttc} = \frac{d_1 \delta T}{d_1 - d_2}$$

The term $$\frac{d_1 - d_2}{d_1}$$

is known herein as the relative change of distance in image space. The time-to-contact $T_{ttc}$ or headway is then given by the time difference found for example from the difference between the time stamps of the image frames divided by the relative change of distance $$\frac{d_1 - d_2}{d_1}.$$

Typically time to contact ($T_{ttc}$) can be improved further by using measurements from multiple or all the image frames 102 ($i$). Using measurements from all the image frames 102 ($i$) indexed with integer i a plot of $1/d_i$ as a function of $\delta T_i$ for each value of time (T) may be made. The points of the plot can be fit with a linear fit producing a line and the point of intersection of the line with the time (T) axis will give the time to contact ($T_{ttc}$) or headway distance. The line can also be fit to a parabola to account for acceleration of host vehicle 108.

In typical driver assistance systems, the headway warning is not an urgent signal. Therefore one can compute the time to contact ($T_{ttc}$) starting at number of image frames 102 and then give a warning only if a large number of measurements agree.

If speed for host vehicle 108 is available then the headway computed using distance/speed may be combined with the headway computed using method 40a and/or 40b to give a more robust warning signal. Using host vehicle 108 speed (V) and time to contact ($T_{ttc}$) derived (step 426 or 436) using method 40b an estimate of the distance (Z) to the vehicle 408R in front may be obtained using:

$$Z = V \times T_{ttc}$$

The distance (Z) does not require knowledge of the camera 104 height or the pitch angle of camera 104. The distance (Z) can then be combined with the distance obtained using FCW (U.S. Pat. No. 711,386) to get a more robust distance measurement using, for example, a Kalman filter.

Fog Detection

Fog detection is an important feature when driving at night since, in the presence of fog, a different light strategy is used. The driver switches off high beams and switches on fog lamps if available. The light strategy during fog is used because light scattered from the high beams in the presence of fog may blind the driver. Not all drivers are aware of this however, and often respond incorrectly to the reduced visibility due to the fog by switching on their high beams. By so doing, they reduce the visibility even more. A fog detection system which can advise the driver or switch lights on and off automatically would be useful. There has been interest in adding a fog detection feature to a camera based driver assistance systems. One method uses spatial gradients in the image. During heavy fog the image contrast drops and so the image loses its sharper edges. However, the presence of sharp edges may also be dependent on other characteristics. Urban scenes have many sharp edges while country scenes have softer edges. Furthermore, mist or condensation on the glass may also create a drop in image contrast and reduce the higher spatial frequencies. Another method may use the relative drop in contrast of a lane mark in higher portions of the image, i.e. as the viewing direction approaches the horizon where the lane mark is farther from the camera. In foggy conditions, a freshly painted lane mark close to the vehicle is quite sharp but the sharpness drops quite quickly for more distant lane marks. It is also possible to monitor the increase in contrast on objects, such as road signs, or lane marks, as they get closer. If a lane departure warning system is already installed, then such fog detection techniques could be used. These methods assume lane markings of good quality or an object in the scene that can be tracked, and they may require significant computational power.

A more direct measure of the driver's need to lower high beams is the amount of scatter produced by the atmospheric conditions. If the scene is dark then it is possible to detect the light of the host vehicle high-beams scattered by the fog back to the camera. The high beams have a very particular back scatter pattern which is determined by the location of the forward looking camera and the vehicle headlights. The back scatter pattern from the high beams of the host vehicle may be learned by using machine learning techniques. The input feature vector may be a few horizontal lines from a low resolution image. The problem is that low beams do not give rise to strong scatter pattern. This is due to the fact that the low beams illuminate the close road which also reflects back to the camera. There is not a significant difference in the reflection pattern from the road or the scatter pattern from the low beams. This means that it is hard to give the driver, who has switched to low beams due to the fog, an indication that the fog has ended and now is a good time to switch back to high beam.

This method may be less applicable in an illuminated night scene. However one might argue that in an illuminated night scene an average driver would use low beams. Fog is readily detectable when other light sources such as street lights are in the scene or other cars with their lights on (high or low) are viewed from the side.

Fog Detection Using a Rear Camera

Figure 5A:
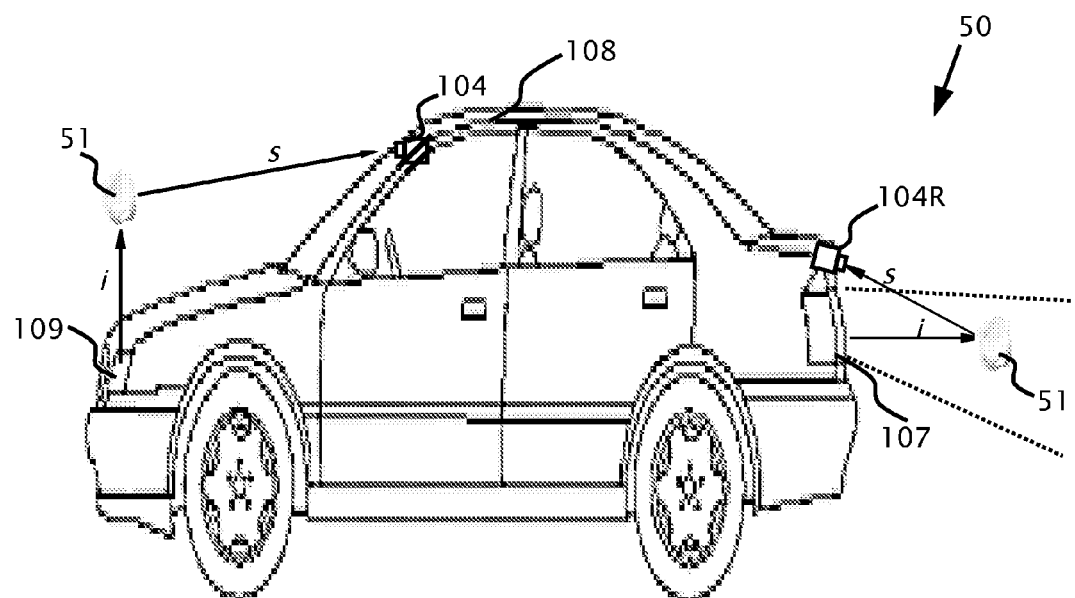
FIG. 5a which illustrates schematically a rear view camera system mounted on host vehicle, according to an aspect of the present invention.

Some car models are available with rear-view camera systems. Reference is now made to FIG. 5a which illustrates schematically a rear view camera system 50 mounted on host vehicle 108, according to an aspect of the present invention Rear camera 104R is shown mounted on the rear of vehicle 108, typically centered along the rear of vehicle 108 and oriented backward. One use of rear camera system 50 is for detection of obstructions behind vehicle 108. Obstruction detection using rear camera system 50 is disclosed in co-pending US patent application publication 20080266396 and international application PCT/US/08062003. The horizontal field of view (HFOV) of camera 104R is large between 130 and 180 degrees. Rear-view camera may view almost the entire cone of light emanating from the host vehicle taillights 107. The cone of light from taillights 107 is shown schematically as between two dotted lines. Thus, rear camera 104R is well located to observe light scatter from taillights 107 due to fog 51 shown as a droplet of water. An incident light ray i is shown and a scattered light ray s scattered into the aperture of camera 104R. In the absence of scattered light from fog 51, at least a portion of the image of image sensor 104R is not illuminated by taillights or background light at night. Furthermore, the light emitted from the taillights is red. Thus the detected scattered light will have a red hue which differentiates the detected scattered light from white background light. Since there are two taillights 107 and camera 104R is symmetrically situated between two taillights 107, a symmetric pattern of detected light is expected due to scattering from fog 51. We will further note that in original equipment manufacture (OEM) series production the location of camera 104R and taillights 107 is known thus the scattered light in the presence of fog 51 causes an expected shape in the image plane of image sensor 104R.

Detection Using Rules

It is possible to engineer a rule based system that looks for particular regions in the image being brighter than other regions and that the red hue is above a certain threshold. One then determines if there is a signal on both left and right edges of the image then fog 51 is detected.

Detection Using Machine Learning

Figure 5B:
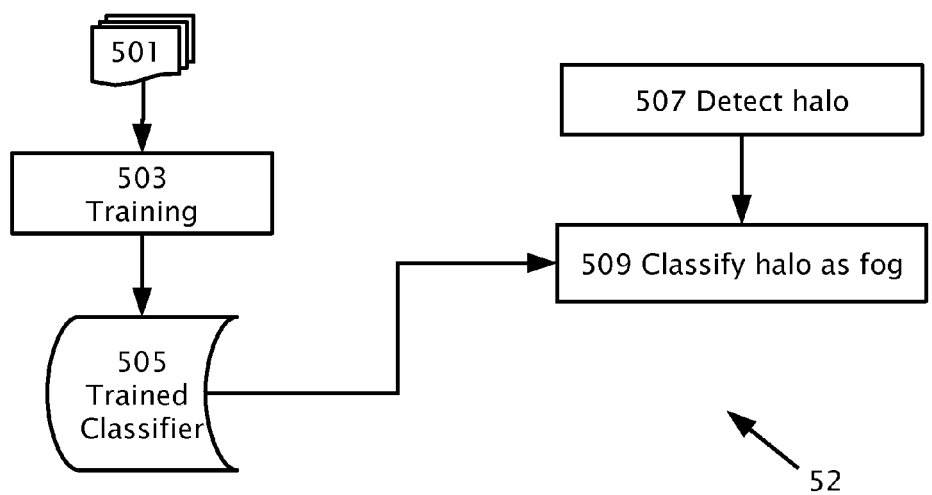
FIG. 5b shows a flow chart of a simplified method for detecting fog using a camera system, according to an embodiment of the present invention.

Alternatively machine learning techniques are used to determine the presence of fog 51. Reference is now made to FIG. 5b which illustrates schematically by way of flow chart a simplified method 52 for detecting fog 51 using camera 104R or camera 104, according to an embodiment of the present invention. A large number of image frames 501 are used for training (step 503) in order to produce a trained classifier 505. Trained classifier 505 is subsequently used to classify (step 509) a detected halo as fog when the halo is detected (step 507)

The image is reduced to 160×120 red/green/blue RGB pixels (i.e. the red, green and blue pixels are averaged separately to preserve color information) and optionally only the left and right 30 columns of the top half of the image are used for fog detection. The result is a feature vector of 80*(2*30)×3 values.

The machine learning technique as used was the support vector machine or SVM. A linear kernel can be used and trained on 100,000 frames 501 of which half are examples of fog taken from multiple vehicles 108 from the same car model. Other machine learning techniques such as principal component Analysis and Fisher discriminants also show promising results.

Since we do not require very fast response information of many frames may be accumulated such as 90 frames (3 seconds at 30 frames per second) and since flickering or oscillating states of headlights and/or fog lights is undesirable a constraint may be imposed that a fraction, e.g. ~80% of the frames agree in order to switch state of fog lights and/or headlights.

Modification of Front Lights and Using Forward Camera 104

Reference is now made again to FIG. 5*a* which illustrates another embodiment of the present invention. Headlight 109 of vehicle 108 is illustrated. A modification of headlight 109 causes a small amount of the light to be diverted upward. A single light ray i is shown propagating upward from headlight 109. In that case the forward looking camera 104 will simply looks for a vertical beam of light. The vertical beam is visible only when there is fog 51 or another scattering medium in the atmosphere. A single ray s scattered from fog 51 is shown.

Other Configurations

Using Change in Light Status

It would advantageous to have additional information about any change in rear light status such as braking, reverse or even turn signals. Any change in brightness that corresponds in time to changes in rear light status may give further indication as to scattering.

Figure 5C:
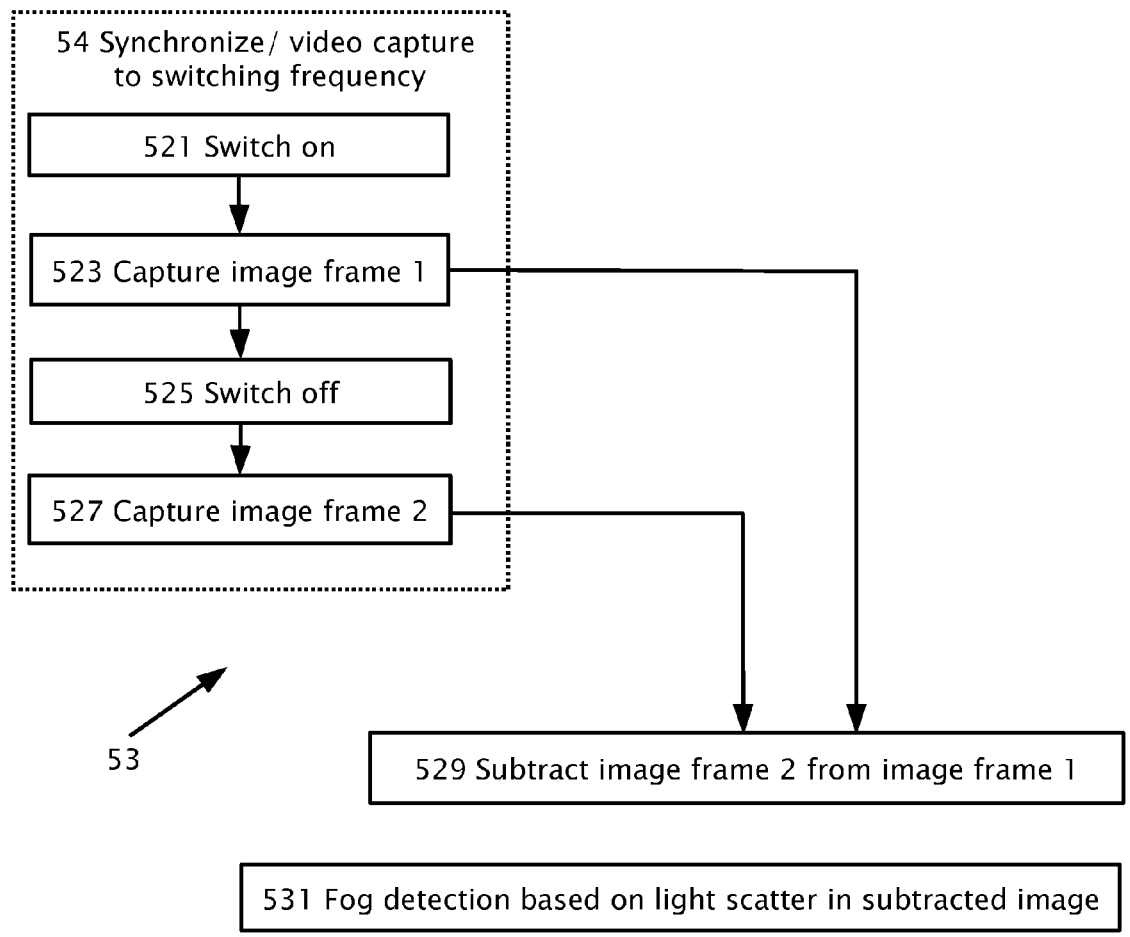
FIG. 5c illustrates a method of fog detection, according to another embodiment of the present invention.

Reference is now made to FIG. 5*c* which illustrates a method 53, according to another embodiment of the present invention. Certain LED taillights flicker at a high frequency. By synchronizing (process 54) video capture to the switching frequency of taillights 107 one can sequentially capture images (steps 523) with taillight illumination and capture images (step 527) without taillight illumination. It would also be possible for the system to initiate a brief flickering of the taillights even in the case of regular incandescent taillights to achieve a similar effect. Taillights or other illumination may be switched on (step 521) and very briefly switched off (step 525). Subtracting (step 529)) or otherwise comparing or correlating the two or more captured images) may include a subtracted image of the light scattered with an enhanced the signal to background ratio for use in fog detection (step 531) based on light scatter in the subtracted image.

Using a Dedicated Light Source

According to another embodiment of the present invention, a special light source such as a LED with a focused beam may be mounted on the car hood in front of the camera with the beam facing up. Since it is a dedicated light source it can be alternatively switched on and off synchronously with image frames of either camera 104 or 104R and then image subtracted the light scattered from the dedicated light source may be sensed.

Single Pole Calibration

Figure 6A:
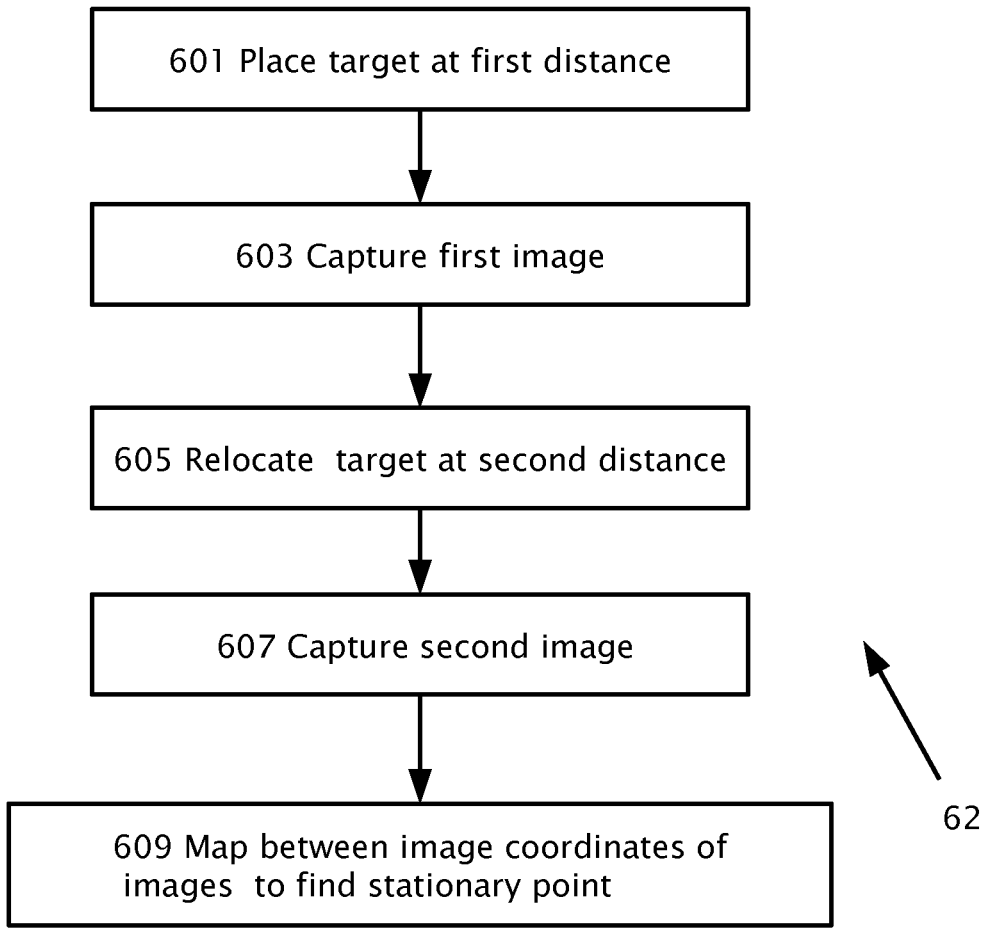
FIG. 6a is a flow chart illustrating a method, according to an embodiment of the present invention for performing calibration of a camera mounted on a host vehicle for use in a driver assistance system.

Reference is now made to FIG. 6 which includes a flow chart illustrating a method 62, according to an embodiment of the present invention for performing calibration of camera 104 mounted in vehicle 108 for use in a driver assistance system. Method 62 uses upright target 60 (FIG. 1*a*) placed at two distances from vehicle 108. Target 60 is first placed (step 601) at a first distance, e.g. up against the front bumper of vehicle 108 on the centerline of the vehicle. Standard features on the vehicle may be used such as the license plate or the car makers emblem. Typically the first distance is zero centimeters—the target is placed touching the front bumper centered on the bumper.

A first image is captured (step 603) of target 60. Target 60 is relocated (step 605) to a second distance, e.g. moved back away from vehicle 108 approximately one meter. The lateral location of the target in the second position is not important. A second image is captured (step 607) of target 60. A mapping (step 609) is performed between respective image coordinates of the first image and the second image. A stationary point during mapping (step 609) is a focus of expansion (FOE) typically on the horizon. This provides the Y coordinate of the FOE used in the algorithms. The lateral position of the target in the first image provides the X coordinate of the FOE used in the algorithms. If the camera is not located in the center of the image this is adjusted for. and adjusted to correspond to the center of vehicle 108. Method 62 may provide the camera orientation in all three angles and the camera height.

Example of a Makeshift Target Assembly for Initial Tests

Reference is now made to FIG. 6*b* which illustrates an example of a calibration target 60, according to an embodiment of the present invention. Target 60 includes an optical pattern 615*b* mounted for instance on a rigid upright pole 610. The base 613 is preferably sufficiently heavy so that it does not wobble. It is recommended that base 613 have three points of support to insure stability. Pattern 615 optionally includes a narrow checker pattern, an example of which is shown in FIG. 6*b* and enlarged in FIG. 6*d*. In this case the squares are optionally five centimeters on the edge. Another example of pattern 615 is shown in FIG. 6*e*. The narrow shape is tends to keep target 60 more stable and to reduce the chance of being blown over by wind. The height of target 60 is designed to be wholly visible when placed close to the bumper of vehicle 108. A different target height is typically required for trucks and automobiles.

Target Size and Height

Reference is now made again to FIG. 6*d* which illustrates pattern 615*b* with six rows of alternating black and white squares. Five saddle points 617 are shown marked with small circles with dotted lines while only the topmost saddle point is labeled with the reference number 617 so as not to clutter the drawing. With an additional five centimeters of wide margin above and below the total target is 40 centimeters high. However, only the middle 30 cm may be visible in the image of camera 104.

Given that target 60 is located about 1.5 meters from camera 104 and the target height is 30 centimeters, the image height is f·(30/150)=95 pixels with a camera lens of focal length 475 pixels. The distance in image space between top and bottom saddle points is 79 pixels. Given that the total image height is 240 pixels we can afford to have the camera height vary about 30 cm without requiring adjustment of the camera height. Thus we may have one target for camera 120 cm-150 cm and a second for camera height 150 cm-180 cm.

For camera height 120 cm to 150 centimeter the center of target 60 should be at 120 centimeter. The bottom at 105 centimeters (bottom saddle point is at 110 centimeters). This value is based on the following reasoning: If target 60 is placed 1.5 meters from camera 104 and target 60 is 30 centimeters in height then about 30 centimeters extra is available to adjust camera height. Assuming target 60 works for vehicles of height within 120 cm to 150 cm then the center of target 60 is at 135 centimeter.

L=30 centimeter target length (six rows of five centimeters in FIG. 6d)

dH=30 centimeter variation in camera height (e.g. from 120 cm to 150 cm)

F=475 focal length in pixels

Z=150 centimeter target longitudinal distance from camera 104

V=vertical extent of target in the image for the camera height variation dH $$V = F\frac{(L+dH)}{Z} = \frac{475 \times (30+30)}{150} = 190 \text{ pixels}$$

The image of pattern 615b of FIG. 6d is 240 pixels high so a margin of error and tolerance is available of about 50 pixels (i.e. 20 to 70 pixels).

The distance between uppermost and lowermost saddle points is 80 pixels which is typically adequate for roll computation even if target 60 is 1.7 m away.

The discussion above does not take into account camera angle (pitch). Camera 104 has been assumed to be horizontal. Consider that camera 104 is pointed down 20-70 pixels. Taking the 5 middle pixel (i.e. 45 pixels) at 1.5 meters, 45 pixels in image space translates in real space to:

$$\frac{(150 \text{ cm.} \times 45 \text{ pixels})}{(475 \text{ pixels})} = 14 \text{ cm.}$$

So target 60 is located 14 cm lower when camera 104 points down equivalent to 45 pixels on the average in image space. Rounding the 14 cm to 15 cm, the center of target 60 is at height 120 centimeters. The bottom of target 60 is at height 105 centimeters and the bottom saddle point is at height 110 cm. A second target height may optionally be used to cover camera heights from 150 cm to 180 cm. The second target height may be 30 cm. higher than the first target height.

A Single Target to Cover the Whole Range

It would be advantageous to avoid having multiple target heights for different camera heights, when camera 104 is mounted on either automobiles and trucks. Reference is now made again to FIG. 6c which illustrates further features of the present invention. Pattern 615c shown in FIG. 6c may be used for camera heights ranging from 120 cm to about 200 cm. corresponding to both smaller automobiles and trucks.

Reference is now made to FIG. 6f which illustrates pattern 615c in more detail. A center portion of 6 rows such as that marked with reference 618 of pattern 615c is optionally used for performing method 62. Two additional strips 619 allow for unique identification of saddle points 617.

If target 60 is placed at a distance greater than 1 m at least 50 cm height of pattern 615c is imaged, corresponding to nine saddle points 617. Pattern 615c includes an innovative feature so each set of six saddle points has a unique code based on strips 619. With nine saddle points 617, at least one transition in strips 619 is imaged and vertical position within pattern 615c may be determined. Note that the corners of strips 619 align with the corners of the black squares to avoid additional saddle points which may be confused with saddle points 617. Pattern 615c is preferably limited in height to about 1 meter so that it does not become to long for packing. Pattern 615c is also optimally of length similar to the longest element of stand 610 so that pattern 615c fits in the same package for shipment. Alternatively, the length of pattern 615c may be extended to 1.6 meters or 1.8 meters without adding another vertical stripe for coding saddle point 617 positions.

An alternative embodiment of the present invention, pattern 615 may be inverted around a rotation point 616 high up on pattern 616. Markings 619 in pattern 615c are designed to be unique under target rotation.

Code Using Strips 619

Let D be the image distance between saddle points 617. For each saddle point 617 we look at the regions 0.5 D to above and 1.5 D to the left and right and check if that region is white or black:

L=1 if the color up and to the left is black
L=0 if the color up and to the left is white
R=1 if the color up and to the right is black
R=0 if the color up and to the right is white We can now compute a code C for each saddle point 617 in pattern 615c:

$$C = 2 \cdot L + R$$

For pattern 615c the codes for the 17 saddle points 617 listed from top to bottom are: 33333222220000022. As one can see each sequence of five codes is unique. If pattern 615c is inverted then the codes are: 11100000111113333. Again, every sequence of five codes is unique. If we do not know the orientation of pattern 615c we look at six codes to get a unique sequence.

Algorithm with Example

The method first detects saddle points where two black squares meet. These are then matched between the two target images. The vertical positions of the points in the two images are used to estimate the stationary point of the horizon, focus of expansion (FOE) Y or horizon. The lateral position of the close target is used to estimate the lateral position of the calibration, focus of expansion (X) or Yaw.

If camera 104 is mounted in the center of vehicle 108 then the average X position of the point can be used as is. The lateral position of the points in the far pole position is ignored since target pole 50b is not centered on vehicle 108. If camera 104 is mounted with an offset to the center this is preferably accounted for. The vertical spacing of the points in the close image is used as a ruler since it corresponds to 5 cm in the real world. Let the measured camera offset be 7 cm and the length of the edge of the square in the close image be 10 pixels. Then the lateral position correction $X_{offset}$ is calculated:

$$X_{offset} = 7/5 \cdot 10 = 14 \text{ pixels}$$

Locating the Target Points in Each Image

Saddle points are known to be the local minimum of the determinant of the Hessian. The first step is to find these local minima with a small threshold. Note, this measure is orientation invariant. This can be computed on a 320 by 240 image.

The second step is to verify these points using normalized cross correlation with a template of a simple checker pattern with two black and two white squares. The size of each square is kept small: typically 5 pixels for the side. Only points with a high enough (positive or negative) score are kept. The results for the close image are shown in by blue points in the bottom left image. Note one spurious point on the dark vehicle parked on the right.

The third step is to find N=5 points that are vertically aligned. We require that they lie within a band of 5 pixels. We further check that they have alternating orientation starting from the top with the upper square off to the left. Other tests such as requiring that the points are evenly spaced can also be used (but not currently implemented).

All such sets of points are detected however we expect only one such set per image. More that one set should generate an error. The right hand images show the detected points.

The determinant of the Hessian is:

$$\begin{vmatrix} I_{xx} & I_{xy} \\ I_{xy} & I_{yy} \end{vmatrix}$$

The x and y derivatives are computed using the Sobel filter:

$$dx = \begin{bmatrix} -0.25 & 0 & 0.25 \\ -0.5 & 0 & 0.5 \\ -0.25 & 0 & 0.25 \end{bmatrix} \quad dy = \begin{bmatrix} 0.25 & 0.5 & 0.25 \\ 0 & 0 & 0 \\ -0.25 & -0.5 & -0.25 \end{bmatrix}$$

We normalize each point by the magnitude of the gradient.

$$\frac{1}{1 + \tilde{I}_x^2 + \tilde{I}_y^2}$$

where we use $\tilde{I}_x$ to denote the blurred versions of the image derivative. Blurring was done by twice convolving with the filter:

$$\begin{bmatrix} 1 & 2 & 1 \\ 2 & 4 & 2 \\ 1 & 2 & 1 \end{bmatrix}.$$

We compute the local minimum of the image by computing the local maximum of the negative of the image. The function returns true for points that are above a certain threshold t and that are greater than all the pixels in a square region of 2·w+1 centered around the point. w is set to 4 and t is set as the standard deviation of the determinant of the Hessian image.

Points are verified to be saddle points if their normalized 2D correlation with a saddle shaped template is greater than 0.7 (or smaller than −0.7). The correlation function is based on Matlab corr2.m. The template is a 22 checker board pattern with squares of size 6 pixels. It is intentionally orientation dependent.

Detecting Vertically Aligned Points
1. For each x from 1 to 320
(a) Count the number of points that lie in a 5 pixel column around x
(b) If greater or equal to N
 i. Sort points in y
 ii. Starting from top point
 iii. Check if N points it matches sequence of left right template. If yes, then mark points as used and return points as line.
 iv. Go to next unused point.
2. If number of lines equals one then return line with 'success', else return 'fail'.
Note: The scan over x could go from min($x_i$) to max($x_i$).

Matching Points Between the Two Images

If we are using the simple case where the target is wholly visible in both images then matching is straightforward: the points are matched one to one starting from either end. In the case that only a subset of the points on the target is visible, we use the unique codes. For each image we compute the sub-code for the subset of points that are visible. We then find the location of the sub-code within the full code of the target. This in turn allows us to give the correct index to each point in the subset. We use only points from the two images with matching indices. Points in one image which do not have a match in the other image are not used. Alignment of the sub-code within the target also gives the true height of each point from the ground.

Computing FOE and other Parameters from Two Lines

The lateral position of the FOE (or 'yaw') is given by the lateral position of the close target. We take the average of the x coordinate of the points on the close line. For the horizon we are looking for the stationary point $y_o$ in the mapping from the y coordinates of the line points in one image $y_1$ to the matching line points in the second image $y_2$.

The model is a scale around a stationary point thus:

$$y_2 = S(y_1 - y_0) + y_0$$

This can be rewritten as a linear set of equations:

$$\begin{pmatrix} y_2(1) & 1 \\ \vdots & \vdots \\ y_2(N) & 1 \end{pmatrix} \begin{pmatrix} S \\ (1-S)y_0 \end{pmatrix} = \begin{pmatrix} y_1(1) \\ \vdots \\ y_1(N) \end{pmatrix}$$

We solve using the pseudo inverse:

$$\begin{pmatrix} S \\ (1-S)y_0 \end{pmatrix} = \begin{pmatrix} \sum_{i=1}^{N} y_2(i)^2 & \sum_{i=1}^{N} y_2(i) \\ \sum_{i=1}^{N} y_2(i) & N \end{pmatrix}^{-1} \begin{pmatrix} \sum_{i=1}^{N} y_2(i) y_1(i) \\ \sum_{i=1}^{N} y_2(i) \end{pmatrix}$$

It is then straightforward to solve for $y_o$.

Adjusting for Camera Lateral Offset

If the camera is not centered in the car it is necessary to adjust for the camera lateral offset. We use the known size of the squares (5 cm) and the vertical spacing between the points in the close image to convert from cm to pixels:

$$F\hat{O}E_x = FOE_x + C_x \frac{T_{pixels} - B_{pixels}}{T_{cm} - B_{cm}}$$

where $C_x$ in the camera lateral offset in cm and $T_{pixels}$, $B_{pixels}$, $T_{cm}$ and $B_{cm}$ are in the position of the top and bottom saddle points in the image and in centimeters from the ground respectively.

Computing Camera Height

To compute camera height we convert the coordinates of the stationary point $y_o$ (also known as $FOE_y$ or horizon) to height from the floor.

$$H = B_{cm} + \frac{(y_0 - B_{pixels})(T_{cm} - B_{cm})}{T_{pixels} - B_{pixels}}$$

Computing Camera Roll

The camera roll is computed from the close target:

$$\text{Roll} = \arctan\left(\frac{X_T - X_B}{Y_T - Y_B}\right)$$

where $X_T$, $X_B$, $Y_T$ and $Y_B$ are the x and y coordinates of the top and bottom saddle points respectively.

Camera Mount

In original equipment manufacture (OEM) installations there is often a specific host vehicle model and since the rake angle of the windshield glass is known in the mechanical design phase, camera mount 70 (FIG. 1a) can be optimized. For after market products, system 10 is potentially installed in a variety of vehicle models with a large variation in windshield rake angles.

Reference is now made to FIG. 7 which illustrates schematically rake angles of windshields 701a and 701b of different vehicle models and camera 104. The camera elevation or pitch is preferably within a desired tolerance angle. According to an embodiment of the present invention, camera mount adapters may be used for each possible windshield rake angle. In practice a single adapter might cover a range of 3 degrees. For each car model, the appropriate adapter is affixed to the vehicle window and camera 104 is inserted into the adapter. The advantage of this method is that the mount can be optimized for the particular angle and bring camera 104 lens close to the windshield glass. A disadvantage is that it requires to supply the after-market unit with a variety of adapters, most of which are not used. An alternative solution, according to another embodiment of the present invention is to use an adjustable mount that can accommodate a variety of angles and is adjusted after fixing the mount to the glass so as to bring the camera to the desired angle. While the angle of camera 104 is correct, the position of camera 104 relative to the glass is not optimal and the distance can be quite large, especially for sharp rake angles. This in turn significantly increases the size of the light shield often attached around camera 104; the light shield is recommended for eliminating stray light reflecting into the camera aperture from the windshield glass. Various mount designs are presented, according to different embodiments of the present invention which allow both adjustment of the angle and ensuring that lens 105 is optimally close to glass 701.

FIG. 7a shows a conventional design of an adjustable mount. As one can see, when camera 104 is adjusted for the sharp rake angle of windshield 701a camera 104 moves away from the glass. The same problem occurs if a ball socket is used with the ball centered above or ball camera 104 or if camera 104 fits inside a sphere mounted inside a ball socket of the same diameter so that camera 104 may be adjusted in all three angles.

Embodiment 1

Axis of Rotation Close to the Glass

A camera mount 70 is desirable that allows adjustment of the camera angle but enforces a constraint that camera lens 105 touches glass 701. Reference is now made to FIGS. 7b and 7c which show an embodiment of camera mount 70 according to the present invention. In FIG. 7b, camera 104 is shown butted up against windshield glass 701 shown at two different angles. Camera mount 70 includes a fixed element 707 mounted flush with windshield 701. Reference is now also made to FIG. 7c which illustrates the embodiment of camera mount 70 of FIG. 7b in more detail. An axis 703 of rotation has been shifted to the tip of lens 105 where the lens mount 105 touches the glass. The body of camera 104 has two extensions 705 one on each side of lens 105. The tip of extension 705 is in line with upper edge of lens 105. From each extension 705, axis pin 703 is attached which is parallel to the glass plane. Axis pins 703 fit into corresponding holes in extension 705. If we wish to have lens 105 actually touch the glass, the holes in the mount extensions 705 may be replaced by grooves and the glass itself closes onto pin 703. After the camera angle is adjusted, camera 104 is locked into position optionally by applying an adhesive, e.g. epoxy adhesive, between extension 705 and fixed element 707. Alternatively, a set screw or any other method as commonly known in the art may be used for locking.

FIG. 7d shows a modification of the previous design (FIGS. 7a-7c) in which an arm 709 with a slot is attached to each side of fixed element 707 and camera body 104. (only one side is shown) Arm 709 rotates around a point 711 on fixed element 707 and slides along pins 713 protruding from camera body 104. If pins 713 are threaded, a nut or wing nut may be used to lock the camera angle.

Further modifications of the design are possible. Reference is now made to FIG. 7i, illustrating camera mount 70 according to another embodiment of the present invention. Arm 709 may have another hole, one for the pin at point 711 connecting to fixed element 707 and the other for a pin 716 attached to camera body 104. The axis at point 703 at the tip of lens 105 may slide in a slot along the glass of windshield 701. If the pin at point 703 is not actually at the tip of lens 105 but further back, a curved slot may be designed that constrains the tip of lens 105 to move along a straight path while touching the glass.

Embodiment 2

Semicircle Design

Reference is now made to FIG. 7e which illustrates two views of a second embodiment of the present invention. The two views differ by the angles of windshield 701. As camera 104 is rotated so that the tip of lens 105 touches glass 701 at point 703, the opposite corner 704 of camera body 104 marks a circular path whose center is point 703 of contact between lens 105 and glass 701. Since opposite corner 704 is the most distant point on camera 104 from the tip of lens 105, the semi-circle shown encloses all of camera 104 during adjustment. Reference is now also made to FIGS. 7f and 7g which show a side view and rear view respectively, of camera mount 70, according to an embodiment of the present invention. Camera body 104 may be modified so that instead of a sharp corner at point 704 it has a flat or beveled surface 704 at the point of contact with a semi-circular strip 714. It should be noted that the flat surface at point 704 is perpendicular to a radius of semi-circular element 714. One can prove, using elementary geometry, that if a flat surface at point 704 is pulled tight towards the semi-circular element, the tip of lens 105 touches center 703 of semi-circular element 714 which is on glass 701, regardless of where on semi-circular element 714 the flat surface touches. One way to pull the flat camera surface tightly towards the semi-circular mount 714 is with a fastener 717, e.g. wing nut or screw. A slot, e.g. of two centimeters, in width is bent into a semi-circle and a slot 715 is cut into it. A threaded hole may be tapped through flat surface on camera body 104. Screw 717 is optionally inserted through slot 715 and then screwed into camera body 104. When screw 717 is tightened the flat surface is pulled tightly towards semi-circular element 714.

Another option is to glue the flat surface to semicircular element 714 once the correct angle has been determined. Another option is to have the semicircle ferromagnetic and camera body 104 be a magnet. Camera 104 is typically constrained to have only one degree of freedom in movement since the flat surface is a rectangular shaped and the minimum distance (radius) is achieved when opposite edges of the rectangle touch semi-circular element 714. If however, camera body 104 is part of a sphere, then the surface at point 704 is a circle. Semi-circular element 714 may be formed from a hemisphere. Screw 717 may then give a second axis of rotation and allow for an adjustment of camera roll. Some lateral rotation (pan) motion is also possible. Semi-circular element 714 may be a portion of a sphere and camera body 104 may be a portion of sphere of the same diameter, so that tip 703 of lens 105 is the center of the sphere. The screw hole may be placed on any location on camera body 104. The screw hole may be placed on the optical axis of camera 104 enabling two axis of motion. Vertical motion to account for windshield rake angle and rotation around the optical axis to account for roll. If camera body 104 is attached to mount 714 using glue or a magnet then the hemisphere inside hemisphere design gives also a lateral rotation (pan) by relaxing the requirement that tip 703 of lens 105 touches glass 701

Reference is now made to FIG. 7h, illustrating a method for mounting a camera behind a windshield according to an embodiment of the present invention. A tilt rotation axis is provided (step 750) at a point between the lens mount and the windshield. The front tip of the lens mount is constrained (step 752) to be in close proximity to or to contact the inside of the windshield for different rake angles of the windshield.

The indefinite articles "a", "an" is used herein, such as "an image frame", "a traffic sign" have the meaning of "one or more" that is "one or more image frames" or "one or more traffic signs".

In the context of a patterned filter, " . . . " means that the pattern continues to repeat.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

What is claimed is:

1. A method for angular adjustment of a camera mountable inside a windshield of a vehicle, the method comprising:
  adjusting an angle of the camera around an axis at a front tip portion of the camera, by rotating a body of the camera while constraining, by a camera mount, the front tip portion to substantially contact an inside surface of the windshield; and
  upon adjusting the angle of the camera, locking angular orientation of the camera.

2. The method of claim 1, wherein the camera mount includes a fixed element, and the method further comprises:
  mounting the fixed element on the inside surface of the windshield; and
  attaching a pin to the fixed element for constraining the front tip portion of the camera to be in close proximity to or to contact the inside surface of the windshield for different rake angles of the windshield.

3. The method of claim 1, wherein the camera mount includes a fixed element, and the method further comprises mounting the fixed element on the inside surface of the windshield, the fixed element having a circular arc cross section in a vertical plane, wherein a tilt rotation axis is substantially at the center of the circular arc cross section.

4. The method of claim 2, further comprising attaching the fixed element to a body of the camera.

5. The method of claim 2, further comprising attaching an arm which attaches the fixed element to the body of the camera.

6. The method of claim 3, further comprising fastening a fastener which attaches through a slot in the fixed element having the circular arc cross section, wherein the fastener constrains the front tip portion of the camera to be in close proximity to or to contact the inside surface of the windshield for different rake angles of the windshield.

7. A camera mount for angular adjustment of a camera mountable inside a windshield of a vehicle, the camera mount comprising:
  an element configured to be mounted to an inside surface of the windshield; and
  an axis in configured to be attached to the element adjacent to the inside surface, the axis in being configured for mounting a front tip portion of the camera such that the tip portion is constrained by the axis in and the element to contact the inside surface during an adjustment of an angle of the camera.

8. The camera mount of claim 7, wherein the element is configured to be mounted flush to the inside surface of the windshield.

9. The camera mount of claim 7, wherein the axis pin is configured to be connected to an extension structure of the camera.

10. The camera mount of claim 7, further comprising an arm having a slot configured to be attached to the element and a camera body, wherein the arm is configured to be rotatable around a second axis pin attached to the element at a location different from a location of the axis pin, and wherein the arm is slidable along a pin protruding from the camera body.

11. The camera mount of claim 7, further comprising an arm attached to the element at a first end and to a camera body at a second end, wherein the axis pin is slidable along a slot in the windshield.

12. The camera mount of claim 7, further comprising only one locking mechanism configured to lock the angle of the camera after the adjustment.

* * * * *